(12) United States Patent  (10) Patent No.: US 11,005,127 B2
Sun et al.  (45) Date of Patent: May 11, 2021

(54) STABLE FLUORINATED ALKYLATED LITHIUM MALONATOBORATE SALTS FOR LITHIUM-ION BATTERY APPLICATIONS

(71) Applicant: UT-Battelle, LLC, Oak Ridge, TN (US)

(72) Inventors: Xiao-Guang Sun, Knoxville, TN (US); Sheng Dai, Knoxville, TN (US); Shun Wan, Salt Lake City, UT (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 15/142,646

(22) Filed: Apr. 29, 2016

(65) Prior Publication Data

US 2017/0331153 A1  Nov. 16, 2017

Related U.S. Application Data

(60) Provisional application No. 62/157,031, filed on May 5, 2015.

(51) Int. Cl.
*H01M 10/0567* (2010.01)
*H01M 10/0568* (2010.01)
(Continued)

(52) U.S. Cl.
CPC ... *H01M 10/0568* (2013.01); *H01M 10/0525* (2013.01); *H01M 10/0569* (2013.01); *H01M 2300/0037* (2013.01)

(58) Field of Classification Search
CPC .................................................. H01M 10/056
See application file for complete search history.

(56) References Cited

U.S. PATENT DOCUMENTS 4,118,550 A  10/1978  Koch
7,060,818 B2  6/2006  Horwitz et al.
(Continued)

FOREIGN PATENT DOCUMENTS

WO  WO 02/068433 A1  9/2002
WO  WO 2012/128714 A1  9/2012

OTHER PUBLICATIONS

Wan et al. "A Stable Fluorinated and Alkylated Lithium Malonatoborate Salt for Lithium Ion Battery Application." Chemical Communications, vol. 51, No. 48, Apr. 27, 2015, pp. 9817-9820., doi: 10.1039/c5cc01428j. (Year: 2015).*

(Continued)

*Primary Examiner* — James Lee
(74) *Attorney, Agent, or Firm* — Scully, Scott, Murphy & Presser, P.C.

(57) ABSTRACT

The invention is directed in a first aspect to electrolyte salt of the general formula $Li^+Z^-$, wherein $Z^-$ has the following chemical formula:

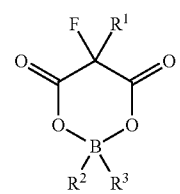

(1)

wherein $R^1$ is an alkyl group (R') containing at least one and up to twelve carbon atoms, and $R^2$ and $R^3$ are independently selected from fluorine atom, hydrocarbon groups R, alkoxy groups (—OR), and ester groups —OC(O)R, wherein $R^2$ (Continued)

and $R^3$ can optionally interconnect via R functionalities to form a boron-containing ring. The invention is also directed to electrolyte compositions in which the above electrolyte salt is incorporated. The invention is further directed to lithium-ion batteries containing these electrolytes.

17 Claims, 19 Drawing Sheets

(51) Int. Cl.
*H01M 10/0525* (2010.01)
*H01M 10/0569* (2010.01)

(56) References Cited

U.S. PATENT DOCUMENTS

| | | | |
|---|---|---|---|
| 7,205,073 | B2 | 4/2007 | Kim et al. |
| 7,425,388 | B2 | 9/2008 | Park et al. |
| 8,129,543 | B2 | 3/2012 | Kawada et al. |
| 8,252,438 | B2 | 8/2012 | Han et al. |
| 9,300,009 | B2 | 3/2016 | Sun et al. |
| 2004/0048163 | A1 | 3/2004 | Park et al. |
| 2006/0068297 | A1 | 3/2006 | Tan et al. |
| 2008/0118845 | A1 | 5/2008 | Ihara et al. |
| 2010/0209783 | A1 | 8/2010 | Siret et al. |
| 2014/0011720 | A1 | 1/2014 | Antzutkin et al. |
| 2014/0113202 | A1* | 4/2014 | Sun ............... H01M 10/052 429/328 |

OTHER PUBLICATIONS

Liao, C. et al., "Synthesis and Characterization of Lithium Bis(fluoromalonato)borate for Lithium-Ion Battery Applications", Adv. Energy Mater. (2014), vol. 4, pp. 1-12.

Driscoll, P.F. et al., "Polyelectrolyte Membranes Containing Lithium Malonato(difluoro)borate for Lithium Ion Systems", ECS Transactions, (2011), Vo. 33, No. 23, pp. 33-53.

Yang, L. et al., "Six-Membered-Ring Malonatoborate-Based Lithium Salts as Electrolytes for Lithium Ion Batteries", ECS Transactions, (2011), vol. 33, No. 39, pp. 57-69.

Sun X.G. et al., "Synthesis and Characterization of Ionic Liquid for Lithium-Ion Batteries", The Electrochemical Society, Pacific Rim meeting on Electrochemical and Solid-State Science (PRIME 2012) (Oct. 7-12, 2012), 28 pages.

Zhang, Z., "Advanced Electrolyte Additives for PHEV/EV Lithium-Ion Battery", Argonne National Laboratory, Vehicle Technologies Program, Washington. D.C. (May 14-18, 2012), 28 pages.

Shao, N. et al, "Electrochemical Windows of Sulfone-Based Electrolytes for High-Voltage Li-Ion Batteries", The Journal of Physical Chemistry B 115:12120-12125 (2011).

Von Cresce, A. et al., "Electrolyte Additive in Support of 5 V Li Ion Chemistry", Journal of the Electrochemical Society, 158(3):A337-A342 (2011).

Bogdanov, M.G. et al., "New Guanidinium-Based Room-Temperature Ionic Liquids, Substituent and Anion Effect on Density and Solubility in Water", Z. Naturforsch 65b:37-48 (2010).

Sun, X.-G. et al., "Electrochecmial Investigations of Ionic Liquids with Vinylene Carbonate for Applications in Rechargeable Lithium Ion Batteries", Electrochimica Acta, 55:4618-4526 (2010).

El Ouatani L. et al., "Effect of Vinylene Carbonate Additive in Li-Ion Batteries: Comparison of LiCoO2/C,LiFePO4/C, and LiCoO2/Li4Ti5O12 Systems", Journal of the Electrochemical Society, (2009), 156(6):A468-477.

Schreiner, C. et al., "Chloride-Free Method to Synthesise New Ionic Liquids with Mixed Borate Anions", Chemistry A European Journal 15:2270-2272 (2009).

Yao, W. et al., "Vinyl Ethylene Sulfite as a New Additive in Propylene Carbonate-Based Electrolyte for Lithium ion Batteries", Energy & Environmental Science, 2:1102-1108 (2009).

Sun X-G et al., "Ether Sulfones with Additive for Electrolytes in Rechargeable Lithium Ion Batteries", 213th ECS Meeting May 18-May 22, 2008 Phoenix, AZ, B1-Batteries General Session, Abstract 162, 1 page.

Sun X-G et al., "Synthesis and Characterization of Network Type Single Ion Conductors", Macromolecules 37:2219-2227 (2004).

Xu K. et al., "Sulfone-Based Electrolytes for Lithium-Ion Batteries", Journal of the Electrochemical Society 149(7):A920-A926 (2002).

Barthel J. et al., "A New Class of Electrochemically and Thermally Stable Lithium Salts for Lthium Battery Electrolytes", J. Electrochm. Soc. 143(11): 3572-3575 (Nov. 1996).

STIC Search Results, Apr. 29, 2015, 58 pages.

* cited by examiner

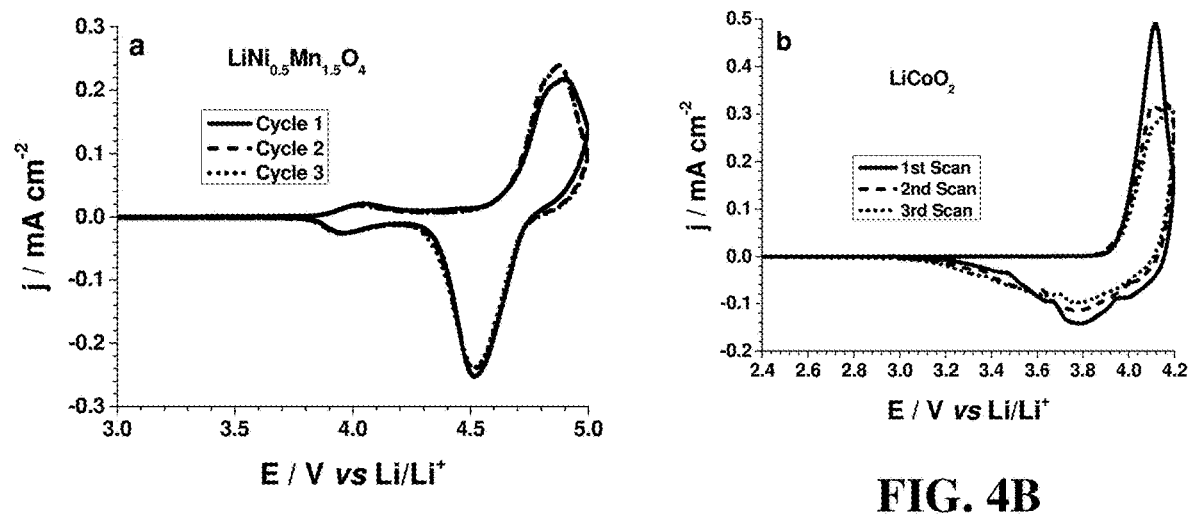
FIG. 4A
FIG. 4B
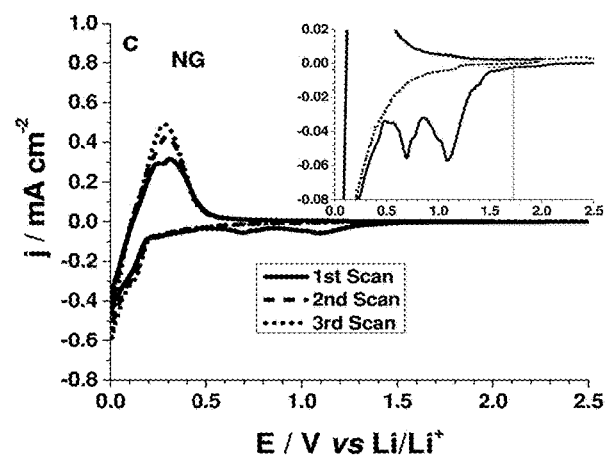
FIG. 4C

FIG. 9A  FIG. 9B

STABLE FLUORINATED ALKYLATED LITHIUM MALONATOBORATE SALTS FOR LITHIUM-ION BATTERY APPLICATIONS

CROSS REFERENCE TO RELATED APPLICATION

The present application claims benefit of U.S. Provisional Application No. 62/157,031, filed on May 5, 2015, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to electrolyte compositions for lithium-ion batteries, and more particularly, to organoborate-containing lithium salts, electrolyte compositions containing such salts, and lithium-ion batteries containing such salts and electrolyte compositions.

BACKGROUND OF THE INVENTION

Lithium-ion batteries (LIBs) are widely used in consumer electronics, such as laptop computers, camcorders, cameras, and cell phones, and are being increasingly considered for applications in electric vehicles and other high-power applications. With pressing worldwide environmental concerns, lithium-ion batteries are being particularly considered for use in electric vehicles (EVs), hybrid electric vehicles (HEVs) and plug-in hybrid-electric vehicles (PHEVs).

The lithium-containing electrolyte has long been an indispensable part of lithium-ion batteries (LIBs), as it plays a critical role in the battery performance. The lithium salt not only is the primary source of free conducting lithium ions, but it also mediates the electrochemical window of the electrolyte and the formation of solid electrolyte interphase (SEI) on the surface of electrodes (Xu, K., Chem. Rev., 2004. 104: p. 4303-4417). Stable lithium salts are even more important for the development of 5.0 V lithium-ion batteries, which are currently being actively pursued in order to increase the power and energy density of the cells. Thus far, $LiPF_6$ has been the most common salt in carbonate mixtures for commercial LIBs, mainly due to its optimum combination of ionic conductivity, ion dissociation, electrochemical window, and electrode interfacial properties. However, $LiPF_6$ is seldom outstanding with respect to any single parameter, and $LiPF_6$ has raised safety concerns in large scale plug-in, hybrid, and all electric vehicles (EVs) because of its low chemical and thermal stability (Tarascon, J. M. and M. Armand, Nature, 2001. 414(6861): p. 359-367). Consequently, researchers have focused on synthesizing new lithium salts to replace $LiPF_6$. Among the new lithium salts, the most favored ones are those containing fluorine atoms, such as lithium bis(trifluoromethylsulfonyl)imide (LiTFSI), lithium bis(perfluoroethylsulfonyl) (LiBETI), lithium tris(trifluoromethylsulfonyl) methide (lithium methide), and lithium pentafluoroethyltrifluoroborate (LiFAB), all of which have been extensively studied during the last two decades.

Lithium orthoborate as a distinct family of lithium salts has been intensively studied because of their thermal stability (e.g., Barthel, J. W., et al., J. of Electrochem. Soc., 1995, 142: p. 2527-31). One particular member is lithium bis(oxalato)borate (LiBOB), which shows significantly improved thermal stability over $LiPF_6$ at an elevated temperature of 70° C. (e.g., Xu, K., et al., Electrochem. Solid-State Lett., 2002. 5: p. A259). Also, a unique feature of LiBOB is the participation in SEI formation by the BOB⁻ anion, allowing the use of pure PC-based electrolyte in graphite electrode-based cells without causing solvent co-intercalation and graphite exfoliation (Xu, K., et al., Solid-State Lett., 2002. 5: p. A259). The reduction process of LiBOB at ca. 1.7 V vs. Li/Li+ is believed to be closely related to the oxalate moiety that affects the initial irreversible capacity (Xu, K., et al., Electrochem. Solid-State Lett., 2003. 6(6): p. A117-A120.). However, it is still difficult to determine whether the oxalate originated from the BOB anion or from an independent oxalate impurity in the LiBOB electrolyte. Furthermore, the SEI films from LiBOB-based electrolyte are more resistive than that from $LiPF_6$-based electrolyte.

As compared to LiBOB, lithium bis(malonato)borate (LiBMB) has rarely been studied, mainly due to its insolubility in common carbonate solvents (Xu, W. and C. A. Angell, Electrochem. Solid-State Lett., 2001. 4(1): p. E1-E4). The first C-2 modified version of LiBMB, lithium bis(allylmalonato)borate (LiBAMB), was synthesized as an intermediate for polymeric single ion conductors, in which the allyl functional group of LiBAMB could be used for hydrosilylation reaction during the grafting step (Sun, X. G., et al., Macromolecules, 2004. 37(6): p. 2219-2227). Later, Schreiner et al reported the synthesis of lithium difluoromono(malonato)borate, Li[BF$_2$Ma], however, no physical properties of this salt was reported (Schreiner, C., et al., Chemistry A European Journal, 2009, 15(10): p. 2270-2272.). Yang et al. have synthesized two C-2 modified lithium salts, lithium dimethylmalonatodifluoroborate (LiDMMDFB) and lithium bis(dimethylmalonato)borate (LiBDMMB), which showed lower ionic conductivity than those of LiBOB and lithium tetrafluoroborate (LiBF$_4$) in ethylene carbonate and ethyl methyl carbonate mixture, which was attributed to the strong ion pairing effect resulting from the electron donating nature of the methyl group (Yang, L., et al., ECS Transactions, 2011. 33(39): p. 57-69). On the other hand, Driscoll et al. showed that both single ion and binary ion conductors based on lithium difluoro-mono(malonato)borate had larger interfacial impedance than that based on TFSI, due to undesirable side reactions of the acidic proton of the salt anion (Driscoll, P. F., et al., ECS Transactions, 2011. 33(23): p. 33-53).

SUMMARY OF THE INVENTION

In one aspect, the invention is directed to a malonatoborate electrolyte salt of the general formula Li⁺Z⁻, wherein Z⁻ has the following chemical formula:

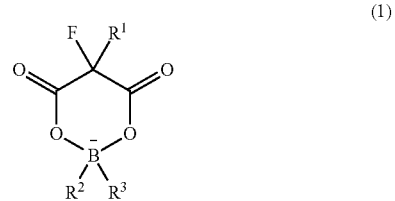

(1)

In Formula (1), $R^1$ is an alkyl group (R') containing at least one and up to twelve carbon atoms, and $R^2$ and $R^3$ are independently selected from fluorine atom, hydrocarbon groups (R) containing at least one and up to twelve carbon atoms, alkoxy groups (—OR), and ester groups —OC(O)R, wherein $R^2$ and $R^3$ can optionally interconnect via R functionalities to form a boron-containing ring. In particular embodiments of Formula (1), at least one of $R^2$ and $R^3$ is a fluorine atom, or both $R^2$ and $R^3$ are fluorine atoms, or $R^2$ and $R^3$ interconnect to form a boron-containing ring.

In some embodiments, $R^2$ and $R^3$ interconnect to result in $Z^-$ having the following chemical formula:

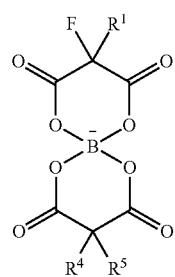

(1a)

In Formula (1a), $R^1$ is as defined above, and $R^4$ and $R^5$ are independently selected from hydrogen atom, fluorine atom, alkyl groups (R') containing at least one and up to twelve carbon atoms, and alkoxy groups (—OR'). In particular embodiments of Formula (1a), at least one of $R^4$ and $R^5$ is a fluorine atom, or both $R^4$ and $R^5$ are fluorine atoms, or $R^4$ is a fluorine atom and $R^5$ is an alkyl group (R') containing at least one and up to twelve carbon atoms.

In another aspect, the invention is directed to electrolyte compositions in which any of the above-described malonatoborate electrolyte salts of the general formula $Li^+Z^-$ is incorporated. In the electrolyte composition, one or more of the above-described malonatoborate electrolyte salts of the general formula $Li^+Z^-$ is dissolved in a liquid or gel solvent suitable for use in a lithium-ion battery. The solvent may be or include, for example, a carbonate or sulfone solvent, or an ionic liquid solvent.

In another aspect, the invention is directed to lithium-ion batteries in which any of the above malonatoborate electrolyte salts or corresponding electrolyte compositions are incorporated. The invention is also directed to the operation of a lithium-ion battery in which any of the above malonatoborate electrolyte salts or corresponding electrolyte compositions are incorporated. The lithium-ion battery contains at least (a) an anode; (b) a cathode; and (c) an electrolyte composition described above, which includes at least one malonatoborate electrolyte salt of the general formula $Li^+Z^-$, as described above.

The above-described malonatoborate salts overcome many of the problems encountered in organoborate salts of the art, such as the problematic acidity of the C-2 hydrogen adjacent to fluorine and two carbonyl groups in lithium bis(fluoromalonato)borate (LiBFMB). Five representative compounds particularly disclosed in this application include lithium bis(2-methyl-2-fluoromalonato)borate (LiBMFMB), lithium bis(2-n-propyl-2-fluoromalonato)borate (LiBPFMB), lithium difluoro-2-methyl-2-fluoromalonatoborate (LiDFMFMB), lithium difluoro-2-ethyl-2-fluoromalonatoborate (LiDFEFMB), and lithium difluoro-2-n-propyl-2-fluoromalonatoborate (LiDFPFMB), all of which have a C-2 hydrogen of the malonato borate ring occupied with an alkyl group in addition to a fluorine atom. Significantly, as further discussed below, the malonatoborate salts described herein all exhibited good performance on both 5V electrode ($LiNi_{0.5}Mn_{1.5}O_4$) and graphite electrode, as well as on 4.0 V electrodes of $LiCoO_2$ and $LiMn_2O_4$. The malonatoborate salts described herein exhibit particularly improved stability and cycling performance over organoborate salts of the art, along with good compatibility with 4.0V and 5.0V cathodes and good rate capabilities.

BRIEF DESCRIPTION OF THE DRAWINGS

FIGS. 4A-4C. Cyclic voltammograms of 1.0M LiDFPFMB/EC-EMC (½, by wt.) using (a) $LiNi_{0.5}Mn_{1.5}O_4$ (FIG. 4A), (b) $LiCoO_2$ (FIG. 4B), and (c) graphite as working electrode and lithium as both counter and reference electrode (FIG. 4C), at a scan rate of 0.1 mV/s.

FIGS. 9A-9C. Charge-discharge profiles (FIG. 9A), cycling performance and coulombic efficiencies (FIG. 9B), and electrochemical impedance spectroscopy (FIG. 9C) of $LiMn_2O_4$||Li cell using 0.8M LiBMFMB/EC-EMC (½ by wt.) at different current rates.

DETAILED DESCRIPTION OF THE INVENTION

Figure 1:
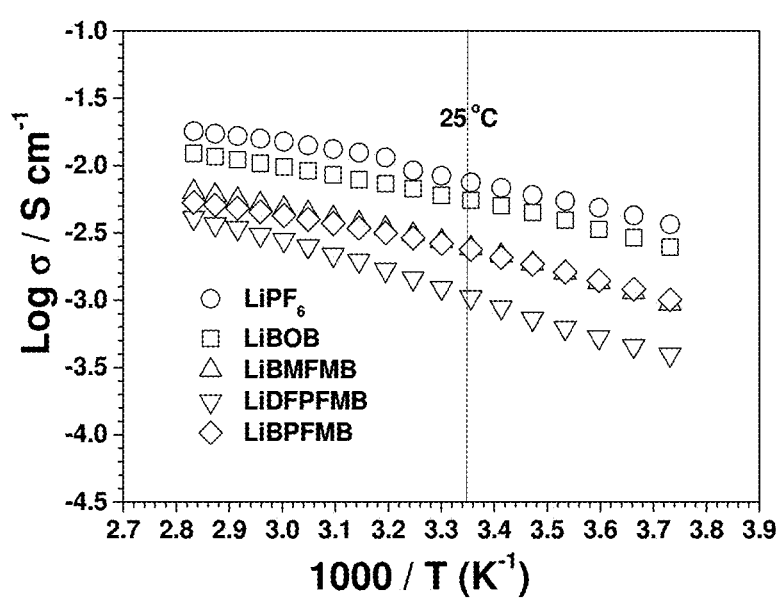
FIG. 1. Graph showing temperature dependence of ionic conductivities of different lithium salt solutions (i.e., $LiPF_6$ and LiBOB, of the art, and LiBMFMB, LiDFPFMB, and LiBPFMB, of the invention) in EC-EMC (½ by wt).

In a first aspect, the invention is directed to malonatoborate electrolyte salts of the general formula Li$^+$Z$^-$, wherein Z$^-$ has the following chemical formula:

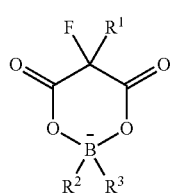

(1)

In Formula (1), R$^1$ is an alkyl group (R') containing at least one and up to twelve carbon atoms. In different embodiments, the alkyl group (R') contains 1, 2, 3, 4, 5, 6, 7, 8, 9, 10, 11, or 12 carbon atoms, or a number of carbon atoms within a range bounded by any two of the foregoing numbers, e.g., 1-6, 2-6, 3-6, 1-4, 2-4, or 1-3 carbon atoms. The alkyl group (R') can be straight-chained, branched, or cyclic. Some examples of straight-chained alkyl groups include methyl, ethyl, n-propyl, n-butyl, n-pentyl, n-hexyl, n-heptyl, n-octyl, n-nonyl, n-decyl, n-undecyl, and n-dodecyl groups. Some examples of branched alkyl groups include isopropyl (2-propyl), isobutyl (2-methylprop-1-yl), sec-butyl (2-butyl), t-butyl, 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, and isohexyl (4-methylpent-1-yl) groups, wherein the "1-yl" suffix represents the point of attachment of the group. Some examples of cyclic alkyl (i.e., cycloalkyl) groups include cyclopropyl, cyclobutyl, cyclopentyl, and cyclohexyl, groups.

The variables R$^2$ and R$^3$ in Formula (1) are independently selected from fluorine atom (F), hydrocarbon groups (R) containing at least one and up to twelve carbon atoms, alkoxy groups (—OR), and ester groups —OC(O)R. In a first set of embodiments, one or both of R$^2$ and R$^3$ are fluorine atoms. In a second set of embodiments, one or both of R$^2$ and R$^3$ are hydrocarbon groups (R). In a third set of embodiments, one or both of R$^2$ and R$^3$ are alkoxy groups (—OR). In a fourth set of embodiments, one or both of R$^2$ and R$^3$ are ester groups —OC(O)R. In a fifth set of embodiments, R$^2$ is a fluorine atom and R$^3$ is a hydrocarbon group (R), or the vice-versa equivalent. In a sixth set of embodiments, R$^2$ is a fluorine atom and R$^3$ is an alkoxy group (—OR). In a seventh set of embodiments, R$^2$ is a fluorine atom and R$^3$ is an ester group —OC(O)R. In an eighth set of embodiments, R$^2$ is a hydrocarbon group (R) and R$^3$ is an alkoxy group (—OR). In a ninth set of embodiments, R$^2$ is a hydrocarbon group (R) and R$^3$ is an ester group —OC(O)R. In a tenth set of embodiments, R$^2$ is an alkoxy group —OR and R$^3$ is an ester group —OC(O)R.

The hydrocarbon group (R), as recited above in groups for R$^2$ and R$^3$, includes all of the alkyl groups (R') described above, and further includes unsaturated groups having one to twelve carbon atoms. In different embodiments, the hydrocarbon group (R) contains 1, 2, 3, 4, 5, 6, 7, 8, 9, 10, 11, or 12 carbon atoms, or a number of carbon atoms within a range bounded by any two of the foregoing numbers, e.g., 1-6, 2-6, 3-6, 1-4, 2-4, or 1-3 carbon atoms. The unsaturated hydrocarbon groups encompassed by R can be selected from, for example, straight-chained alkenyl (olefinic) or alkynyl groups, branched alkenyl or alkynyl groups, aliphatic carbocyclic groups, and aromatic carbocyclic groups. Some examples of straight-chained alkenyl groups include vinyl, propen-1-yl (allyl), 1-buten-4-yl (CH$_2$═CH—CH$_2$—CH$_2$—), 2-buten-4-yl (CH$_2$—CH═CH—CH$_2$—), butadienyl, and 1-penten-4-yl groups. Some examples of branched alkenyl groups include propen-2-yl, 1-buten-3-yl (CH$_2$═CH—CH.—CH$_3$), 1-buten-2-yl (CH$_2$═C.—CH$_2$—CH$_3$), 1-penten-4-yl, 1-penten-3-yl, 2-penten-4-yl, 2-penten-3-yl, and 1,3-pentadien-3-yl groups, wherein the dot in the foregoing exemplary formulas represents a radical or the point of attachment of the group. Some examples of aliphatic carbocyclic groups include cyclopropenyl, cyclobutenyl, cyclopentenyl, cyclopentadienyl, cyclohexenyl, and cyclohexadienyl groups. Some examples of aromatic carbocyclic groups include phenyl and benzyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene. The variables R$^2$ and R$^3$ can be selected from any of the hydrocarbon groups (R) provided above.

In some embodiments, the hydrocarbon group (R) group may include one or more heteroatoms (i.e., non-carbon and non-hydrogen atoms), such as one or more heteroatoms selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR), carbonyl-containing (e.g., carboxylic acid, ketone, aldehyde, carboxylate ester, amide, and urea functionalities), nitro (NO$_2$), carbon-oxygen-carbon (ether), sulfonyl, and sulfinyl (i.e., sulfoxide)

groups. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. In the case of an ether group, the ether group can also be a polyalkyleneoxide (polyalkyleneglycol) group, such as a polyethyleneoxide group. Some examples of nitrogen-containing groups include primary amine, secondary amine, tertiary amine (i.e., —$NR_2$ or $NR_3^+$, wherein R is independently selected from H and hydrocarbon groups set forth above), nitrile, amide (i.e., —C(O)$NR_2$ or —NRC(O)R, wherein R is independently selected from hydrogen atom and hydrocarbon groups set forth above), imine (e.g., —CR=NR, wherein R is independently H or a hydrocarbon group), oxime (—CR=N—OH), amidoxime (—C($NH_2$)=N—OH), nitro, urea (—NR—C(O)—$NR_2$, wherein R is independently H or a hydrocarbon group), and carbamate groups (—NR—C(O)—OR, wherein R is independently H or a hydrocarbon group). Some examples of phosphorus-containing groups include —$PR_2$, —$PR_3^+$, —P(=O)$R_2$, —P(OR)$_2$, —O—P(OR)$_2$, —R—P(OR)$_2$, —P(=O)(OR)$_2$, —O—P(=O)(OR)$_2$, —O—P(=O)(OR)(R), —O—P(=O)$R_2$, —R—P(=O)(OR)$_2$, —R—P(=O)(OR)(R), and —R—P(=O)$R_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide (—R—S—S—R), sulfoxide (—S(O)R), sulfone (—$SO_2$R), sulfonate (—S(=O)$_2$OR, wherein R is H, a hydrocarbon group, or a cationic group), and sulfate groups (—OS(=O)$_2$OR, wherein R is H, a hydrocarbon group, or a cationic group). Some examples of halide atoms include fluorine, chlorine, bromine, and iodine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group. Alternatively, or in addition, one or more of the heteroatom-containing groups can replace one or more hydrogen atoms on the hydrocarbon group. In some embodiments, any one or more of the above heteroatoms or heteroatom groups may be excluded from the hydrocarbon (R).

In some embodiments, $R^2$ and $R^3$ interconnect via R functionalities to form a boron-containing ring. For example, if $R^2$ and $R^3$ are alkoxy groups (—OR), they may interconnect via their R functionalities to form a ring containing borate ether groups.

In some embodiments, $R^2$ and $R^3$ are ester groups —OC(O)R with the two R groups interconnected. The resulting anion $Z^-$ has the following chemical formula:

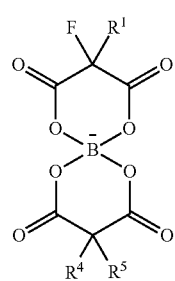

(1a)

In Formula (1a), $R^1$ is as defined above, and $R^4$ and $R^5$ are independently selected from hydrogen atom, fluorine atom, alkyl groups (R') containing at least one and up to twelve carbon atoms, and alkoxy groups (—OR'), all as described above. In a first set of embodiments, one or both of $R^4$ and $R^5$ are hydrogen atoms. In a second set of embodiments, one or both of $R^4$ and $R^5$ are fluorine atoms. In a third set of embodiments, one or both of $R^4$ and $R^5$ are alkyl groups (R'). In a fourth set of embodiments, one or both of $R^4$ and $R^5$ are alkoxy groups (—OR'). In a fifth set of embodiments, $R^4$ is a hydrogen atom and $R^5$ is a fluorine atom, or the vice-versa equivalent. In a sixth set of embodiments, $R^4$ is a hydrogen atom and $R^5$ is an alkyl group (R'). In a seventh set of embodiments, $R^4$ is a hydrogen atom and $R^5$ is an alkoxide group (—OR'). In an eighth set of embodiments, $R^4$ is a fluorine atom and $R^5$ is an alkyl group (R'). In a ninth set of embodiments, $R^4$ is a fluorine atom and $R^5$ is an alkoxy group (—OR'). In a tenth set of embodiments, $R^4$ is an alkyl group (R') and $R^5$ is an alkoxy group (—OR').

In another aspect, the invention is directed to an electrolyte composition for a lithium-ion battery, wherein the electrolyte composition includes one or more of any of the malonatoborate salts according to Formula (1) or (1a), as described above, dissolved in a liquid or gel solvent suitable for use in a lithium-ion battery. The solvent is selected from any of the solvents known in the art to be useful in a lithium-ion battery. The solvent can be, for example, an organic solvent or ionic liquid. The malonatoborate salt is included in the electrolyte composition preferably in an amount which imparts a suitable concentration of lithium ions and suitable level of conductivity to the electrolyte medium. The conductivity of the electrolyte composition can be, for example, at least 0.01 mS/cm (0.001 S/m) at an operating temperature of interest, and particularly at a temperature within 20-60° C. The malonatoborate salt is typically included in the solvent in a concentration of at least 0.1 M. In different embodiments, the malonatoborate salt is included in the solvent in an amount of at least, above, up to, or less than, for example, 0.2, 0.5, 1, 1.2, 1.5, 1.8, 2, 2.5, or 3 M, where "M" indicates a molarity concentration.

In one set of embodiments, the malonatoborate salt is dissolved in an organic solvent. The organic solvent can be, for example, a carbonate, sulfone, siloxane, silane, ether, ester, nitrile, sulfoxide, or amide solvent, or a mixture thereof. Some examples of carbonate solvents include propylene carbonate (PC), ethylene carbonate (EC), butylene carbonate (BC), dimethyl carbonate (DMC), diethyl carbonate (DEC), dipropyl carbonate (DPC), ethyl methyl carbonate (EMC), methyl propyl carbonate (MPC), ethyl propyl carbonate (EPC), chloroethylene carbonate, and fluorocarbonate solvents (e.g., fluoroethylene carbonate and trifluoromethyl propylene carbonate). Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone). Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone (NMP). Still other solvents include hexamethylphosphoramide acid (HMPA), 1,3-dimethyl-3,4,5,6-tetrahydro-2(1H)-pyrimidinone (DMPU), and propylene glycol methyl ether acetate (PGMEA).

A solvent additive may also be included in the electrolyte. If present, the solvent additive should typically facilitate formation of a solid electrolyte interphase (SEI) on the anode. The solvent additive can be, for example, a solvent that possesses one or more unsaturated groups containing a carbon-carbon double bond and/or one or more halogen atoms. Some particular examples of solvent additives include vinylene carbonate (VC), vinyl ethylene carbonate, allyl ethyl carbonate, vinyl acetate, divinyl adipate, acrylic acid nitrile, 2-vinyl pyridine, maleic anhydride, methyl cinnamate, ethylene carbonate, halogenated ethylene carbonate, bromobutyrolactone, methyl chloroformate, and sulfite additives, such as ethylene sulfite (ES), propylene sulfite (PS), and vinyl ethylene sulfite (VES). In other embodiments, the additive is selected from 1,3-propanesultone, ethylene sulfite, propylene sulfite, fluoroethylene sulfite (FEC), α-bromo-γ-butyrolactone, methyl chloroformate, t-butylene carbonate, 12-crown-4 ether, carbon dioxide ($CO_2$), sulfur dioxide ($SO_2$), sulfur trioxide ($SO_3$), acid anhydrides, reaction products of carbon disulfide and lithium, and polysulfide. The additive is generally included in an amount that effectively impacts SEI formation without reducing the electrochemical window by an appreciable extent, i.e., below about 5.0V. For example, the additive may be included in an amount of precisely, about, at least, above, up to, or less than 0.1, 0.5, 1, 2, 3, 4, 5, 10, 15, 20, 25, 30, 35, 40, 45, 50, 60, 70, or 80 wt % by weight of the electrolyte, or an amount within a range bounded by any two of the foregoing exemplary values, wherein the lithium salt is not considered in the wt %. In some embodiments, one or more of the foregoing solvent additives may function predominantly or completely as the polar aprotic solvent (e.g., 90, 95, or 100 wt % of the electrolyte).

In another set of embodiments, the malonatoborate salt is dissolved in an ionic liquid, or in a mixture of ionic liquid and organic solvent and/or solvent additive. The ionic liquid can be denoted by the formula $Y^+X^-$, wherein r is a cationic component of the ionic liquid and $X^-$ is an anionic component of the ionic liquid. The formula $(Y^+)(X^-)$ is meant to encompass a cationic component ($Y^+$) having any valency of positive charge, and an anionic component ($X^-$) having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables).

The ionic liquid compound is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion ($Y^+$) of the ionic liquid $Y^+X^-$ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. The counteranion ($X^-$) of the ionic liquid can be any of the counteranions well known in the art. In some embodiments, the counteranion is inorganic by not including any C—C, C—H, or C—F bonds, such as a halide (e.g., $F^-$, $Cl^-$, $Br^-$, or $I^-$), $PCl_6^-$, $PF_6^-$, perchlorate, chlorate, chlorite, cyanate, isocyanate, thiocyanate, isothiocyanate, perbromate, bromate, bromite, periodate, iodate, dicyanamide (i.e., $N(CN)_2^-$), tricyanamide (i.e., $N(CN)_3^-$), nitrate, nitrite, carbonate, bicarbonate, sulfate, sulfite, hydrogensulfate, hydrogensulfite, phosphate, hydrogenphosphate ($HPO_4^{2-}$), and dihydrogenphosphate ($H_2PO_4^-$). In other embodiments, the counteranion is carbon-containing (i.e., organic) by containing at least one C—C, C—H, or C—F bond, such as the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of polar aprotic solvents, solvent additives, and/or ionic liquids are excluded from the electrolyte. In other embodiments, a combination of two or more polar aprotic solvents or a combination of two or more solvent additives and/or ionic liquids are included in the electrolyte.

The electrolyte composition may or may not also include one or more further (i.e., secondary or tertiary) lithium salts, in addition to the malonatoborate salt of Formula (1) or (1a). The additional lithium salt can be any of the lithium salts (lithium ion electrolytes) known in the art for use in lithium-ion batteries.

In one embodiment, the additional lithium salt is non-carbon-containing (i.e., inorganic). The lithium salt can include lithium ions in combination with such counteranions as, for example, the halides (e.g., chloride, bromide, or iodide), hexachlorophosphate ($PCl_6^-$), hexafluorophosphate ($PF_6^-$), perchlorate, chlorate, chlorite, perbromate, bromate, bromite, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates, or any of the counteranions ($X^-$) provided above for the ionic liquid.

In another embodiment, the additional lithium salt is carbon-containing (i.e., organic). The organic counteranion may, in one embodiment, lack fluorine atoms. For example, the lithium salt can include lithium ions in combination with such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium salt can include lithium ions in combination with such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonimides (e.g., $(CF_3SO_2)_2N^-$).

In some embodiments, any one or more classes or specific types of the additional lithium salts, provided above, are excluded from the electrolyte. In other embodiments, a combination of two or more lithium salts are included in the electrolyte.

In another aspect, the invention is directed to a lithium-ion battery containing any of the electrolyte compositions described above. The lithium-ion battery may contain any of the components typically found in a lithium-ion battery, including positive (cathode) and negative (anode) electrodes, current collecting plates, a battery shell, such as described in, for example, U.S. Pat. Nos. 8,252,438, 7,205,073, and 7,425,388, the contents of which are incorporated herein by reference in their entirety. The positive (cathode) electrode can be, for example, a lithium metal oxide, wherein the metal is typically a transition metal, such as Co, Fe, Ni, or Mn, or combination thereof. Some examples of cathode materials include $LiCoO_2$, $LiMn_2O_4$, $LiNiCoO_2$, $LiMnO_2$, $LiFePO_4$, and $LiNi_xMn_{2-x}O_4$ compositions, such as $LiNi_{0.5}Mn_{1.5}O_4$, the latter of which are particularly suitable as 5.0V cathode materials. The cathode may alternatively have a layered-spinel integrated $Li[Ni_{1/3}Mn_{2/3}]O_2$ composition, as described in, for example, Nayak et al., *Chem. Mater.*, 2015, 27 (7), pp. 2600-2611. To improve conductivity at the cathode, conductive carbon material (e.g., carbon black, carbon fiber, or graphite) is typically admixed with the positive electrode material. The negative (anode) electrode is typically a carbon-based composition in which lithium ions can intercalate or embed, such as graphite (e.g., natural or artificial graphite), petroleum coke, carbon fiber (e.g., mesocarbon fibers), or carbon (e.g., mesocarbon) microbeads. The positive and negative electrode compositions are typically admixed with an adhesive (e.g., PVDF, PTFE, and co-polymers thereof) in order to be properly molded as electrodes. Typically, positive and negative current collecting substrates (e.g., Cu or Al foil) are also included. The assembly and manufacture of lithium-ion batteries is well known in the art.

In yet another aspect, the invention is directed to a method of operating a lithium-ion battery that contains any of the electrolyte compositions described above. The operation of lithium-ion batteries is well known in the art.

Examples have been set forth below for the purpose of illustration and to describe certain specific embodiments of the invention. However, the scope of this invention is not to be in any way limited by the examples set forth herein.

EXAMPLES

Synthesis of lithium bis(2-methyl-2-fluoromalonato)borate (LiBMFMB)

A general schematic of the synthesis of LiBMFMB is provided as follows:

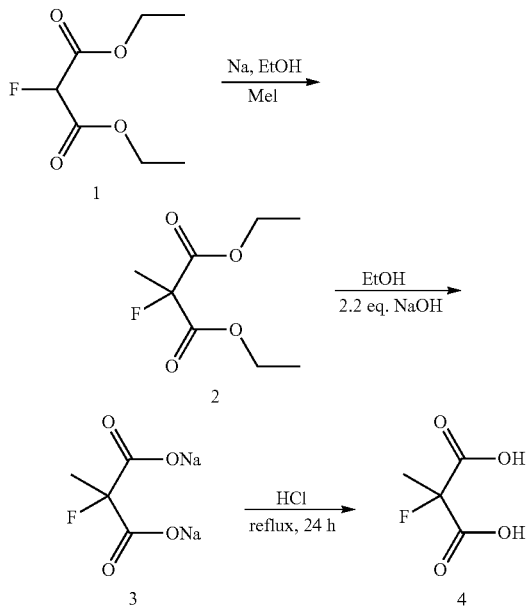

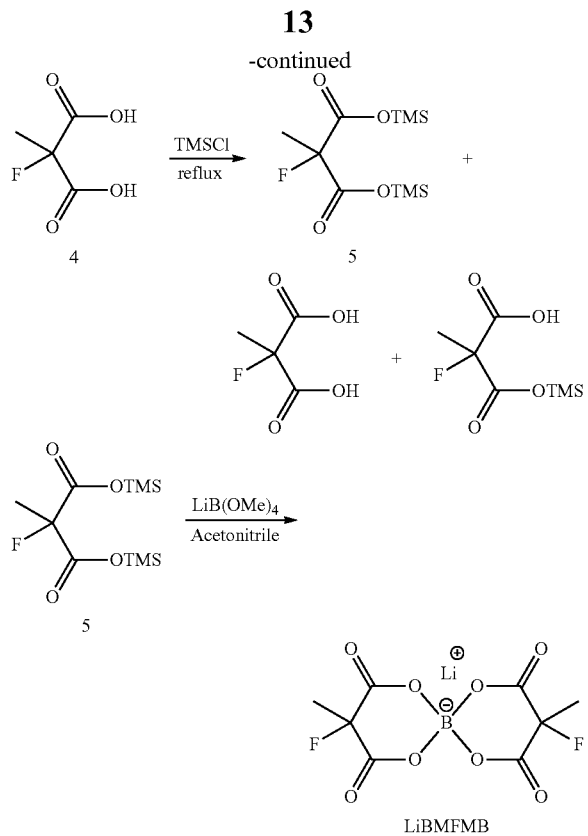

Diethyl 2-methyl-2-fluoromalonate (compound 2): To a solution of sodium (2.3 g, 0.1 mol) in ethanol (100 mL), diethyl fluoromalonate (17.8 g, 0.1 mol) was added dropwise. The mixture was stirred at room temperature for 30 minutes and methyl iodide (14 g, 0.1 mol) was added dropwise, and the resulting solution was refluxed for 1 hour. The solvent was evaporated and the residue was distilled under reduced pressure to give pure diethyl methylfluoromalonate (2) (17.9 g, 75%), boiling point: 54-55° C./0.07 mmHg. $^1$H NMR (D$_2$O, 400 MHz) δ ppm: 4.92 (d, 1H, $^2J_{HF}$=53.2 Hz). $^{13}$C NMR (acetone-d$_6$, 100 MHz) δ ppm: 172.9 (d, $^2J_{CF}$=21.2 Hz), 89.75 (d, $^2J_{CF}$=185 Hz).

Sodium 2-methyl-2-fluoromalonate (compound 3): Compound 3 was synthesized by using the procedure provided in Liao, C., et al., *Adv. Energy Mater.*, 2014. 4: pp. 1301368 (1-12). Yield: quantitative. $^1$H NMR (D$_2$O, 400 MHz) δ ppm: 4.92 (d, 1H, $^2J_{HF}$=53.2 Hz). $^{13}$C NMR (acetone-d$_6$, 100 MHz) δ ppm: 172.9 (d, $^2J_{CF}$=21.2 Hz), 89.75 (d, $^2J_{CF}$=185 Hz).

2-methyl-2-fluoromalonic acid (compound 4): Dry sodium methylfluoromalonate was dissolved in large excess of concentrated HCl solution, and the heterogeneous solution was stirred at room temperature overnight. After the reaction was completed, HCl was removed by vigorous nitrogen bubbling, followed by roto-evaporating at 80° C. The concentrated liquid was dissolved in 500 mL of ether and the precipitated NaCl was removed by filtration. The product was obtained after removing solvent. Yield: 90%. $^1$H NMR (acetone-d$_6$, 400 MHz) δ ppm: 8.47 (s, 2H), 5.82 (d, $^2J_{HF}$=48 Hz). $^{13}$C NMR (CD$_3$CN, 100 MHz) δ ppm: 165.2 (d, $^2J_{CF}$=24.3 Hz), 85.0 (d, $^1J_{CF}$=190.3 Hz).

Bis(trimethylsilyl) 2-methyl-2-fluoromalonate (compound 5) (mixture with mono-ester): A mixture of methylfluoromalonic acid and trimethylsilyl chloride was refluxed for 4 days, during which the by-product HCl was removed by vacuum and fresh trimethylsilyl chloride was added several times. The reaction was monitored by NMR, and when the highest ratio of the final product to the monoester was observed, the reaction was stopped. The excess amount of trimethylsilyl chloride was removed by rotovap and the crude product was further purified by distillation. Yield: 60%. $^1$H NMR (CDCl$_3$, 400 MHz) δ ppm: 1.69 (d, 1H, $^2J_{HF}$=49.0), 0.33 (s, 18H).

Lithium bis(2-methyl-2-fluoromalonato)borate (LiBMFMB): LiB(OCH$_3$)$_4$ (one equivalent) and bis(trimethylsilyl) (2-fluoro-2-methyl)malonate mixture with monoester (two equivalents) was mixed in argon-saturated anhydrous acetonitrile and stirred at room temperature for 12 hours. After the reaction was completed, the mixture was filtered to remove insoluble parts. The solvent was removed by rotary evaporation at 50° C. before drying in a vacuum oven at 75° C. for 24 hours. Pure white powder was obtained after washing with ether. Yield: 70%. $^1$H NMR (DMSO-d$_6$, 400 MHz) δ ppm: 1.83 (d, $^2J_{HF}$=20). $^{11}$B NMR (DMSO-d$_6$, 128.4 MHz) δ ppm: 1.27. $^{19}$F NMR (DMSO-d$_6$, 376 MHz) δ ppm: −159.43 (q, $^2J_{HF}$=29.3). $^7$Li NMR (DMSO-d$_6$, 155.4 MHz) δ ppm: −1.04.

Synthesis of lithium bis(2-n-propyl-2-fluoromalonato)borate (LiBPFMB)

A general schematic of the synthesis of LiBPFMB is provided as follows:

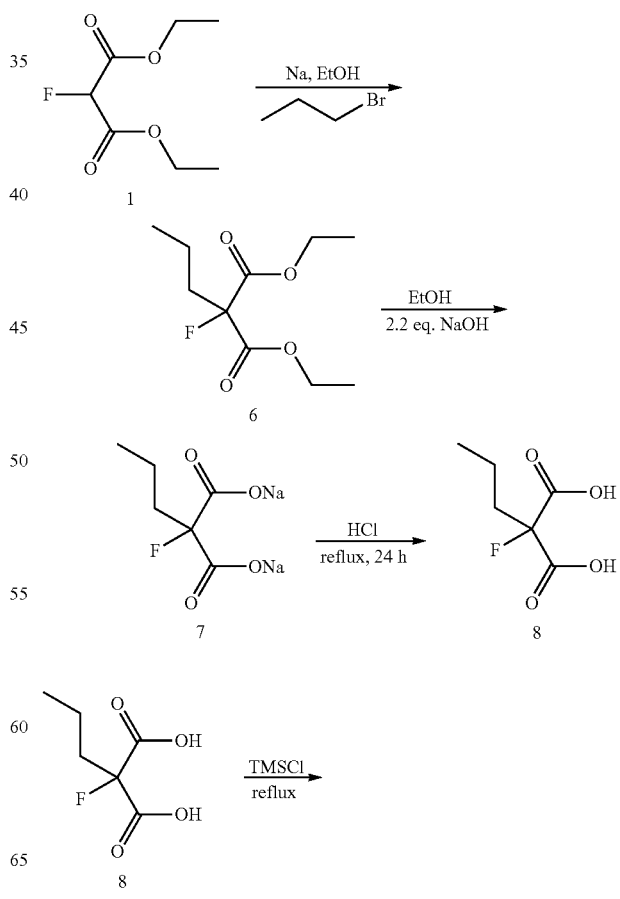

-continued

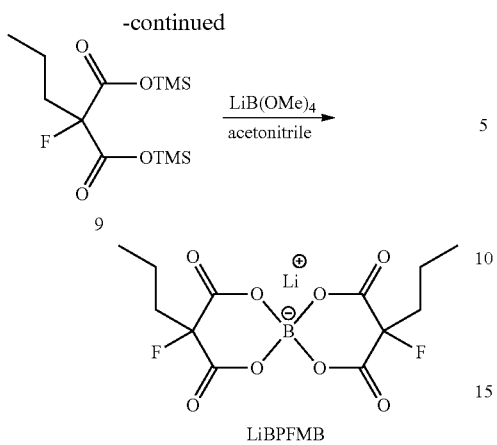

LiBPFMB

Diethyl 2-n-propyl-2-fluoromalonate (compound 6): To a solution of sodium (2.3 g, 0.1 mol) in ethanol (100 mL), diethyl fluoromalonate (17.8 g, 0.1 mol) was added dropwise. The mixture was stirred at room temperature for 30 minutes and 1-bromopropane (12.3 g, 0.1 mol) was added dropwise and the resulting solution was refluxed for 1 hour. The solvent was evaporated and the residue was distilled under reduced pressure to give pure diethyl n-propylfluoromalonate (2) (17.9 g, 75%), boiling point: 54-55° C./0.07 mmHg. $^1$H NMR (D$_2$O, 400 MHz) δ ppm: 4.92 (d, 1H, $^2J_{HF}$=53.2 Hz). $^{13}$C NMR (acetone-d$_6$, 100 MHz) δ ppm: 172.9 (d, $^2J_{CF}$=21.2 Hz), 89.75 (d, $^2J_{CF}$=185 Hz).

Sodium 2-n-propyl-2-fluoromalonate (compound 7): Compound 7 was synthesized by using the same procedure of our group. Yield: quantitative. $^1$H NMR (D2O, 400 MHz) δ ppm: 4.92 (d, 1H, $^2J_{HF}$=53.2 Hz). $^{13}$C NMR (acetone-d$_6$, 100 MHz) δ ppm: 172.9 (d, $^2J_{CF}$=21.2 Hz), 89.75 (d, $^2J_{CF}$=185 Hz).

2-n-propyl-2-fluoromalonic acid (compound 8): Dry sodium 2-n-propyl-2-fluoromalonate was dissolved in large excess of concentrated HCl solution and the heterogeneous solution was stirred at room temperature overnight. After the reaction was completed, HCl was removed by vigorous nitrogen bubbling, followed by roto-evaporating at 80° C. The concentrated liquid was dissolved in 500 mL of ether and the precipitated NaCl was removed by filtration. The product was obtained after removing solvent under vacuum. Yield: 90%. $^1$H NMR (acetone-d$_6$, 400 MHz) δ ppm: 8.47 (s, 2H), 5.82 (d, $^2J_{HF}$=48 Hz). $^{13}$C NMR (CD$_3$CN, 100 MHz) δ ppm: 165.2 (d, $^2J_{CF}$=24.3 Hz), 85.0 (d, $^1J_{CF}$=190.3 Hz).

Bis(trimethylsilyl) 2-n-propyl-2-fluoromalonate (compound 9): A mixture of 2-n-propyl-2-fluoromalonic acid and trimethylsilyl chloride was refluxed for 4 days. During the reaction period, the byproduct HCl was removed by vacuum, and fresh trimethylsilyl chloride was added several times. By monitoring using NMR, the reaction was stopped when the best ratio of final product was observed. The excess amount of trimethylsilyl chloride was removed by rotovap, and the crude product was further purified by distillation. Yield: 60%. $^1$H NMR (CDCl$_3$, 400 MHz) δ ppm: 1.69 (d, 1H, $^2J_{HF}$=49.0), 0.33 (s, 18H).

Lithium bis(2-n-propyl-2-fluoromalonato)borate (LiBPFMB): LiB(OCH$_3$)$_4$ (one equivalent) and bis(trimethylsilyl) 2-n-propyl-2-fluoromalonate (two equivalents) were mixed in argon-saturated anhydrous acetonitrile and stirred at room temperature for 12 hours. After the reaction was completed, a homogeneous solution was formed. The solvent was removed by rotary evaporation at 50° C. before drying in a vacuum oven at 75° C. for 24 hours. Pure white powder was obtained after washing with ether. Yield: 68%. $^1$H NMR (DMSO-d$_6$, 400 MHz) δ ppm: 2.079-2.181 (m, 2H), 1.36-1.50 (m, 2H), 0.93 (t, 3H). $^{11}$B NMR (DMSO-d$_6$, 128.4 MHz) ppm: 1.24. $^{19}$F NMR (DMSO-d$_6$, 376 MHz) δ ppm: −167.76 (t, $^2J_{HF}$=32.72). $^7$Li NMR (DMSO-d$_6$, 155.4 MHz) δ ppm: −0.82.

Synthesis of lithium difluoro-2-n-propyl-2-fluoromalonatoborate (LiDFPFMB)

A general schematic of the synthesis of LiDFPFMB is provided as follows:

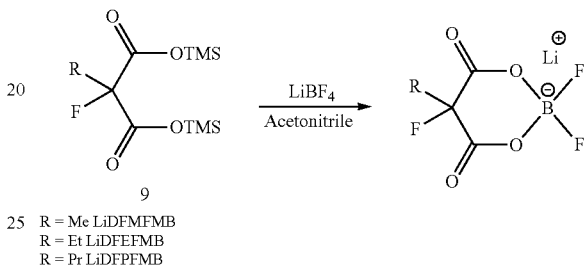

R = Me LiDFMFMB
R = Et LiDFEFMB
R = Pr LiDFPFMB

Lithium difluoro-mono-2-n-propyl-2-fluoromalonatoborate (LiDFPFMB): LiBF4 (one equivalent) and bis(trimethylsilyl) 2-n-propyl-2-fluoromalonate (one equivalent) were mixed in argon-saturated anhydrous acetonitrile and stirred at room temperature for 12 hours. After the reaction was completed, a homogeneous solution was formed. The solvent was removed by rotary evaporation at 50° C. before drying in a vacuum oven at 75° C. for 24 hours. Pure white powder was obtained after washing with ether. Yield: 60%. $^1$H NMR (DMSO-d$_6$, 400 MHz) δ ppm: 2.079-2.181 (m, 2H), 1.36-1.50 (m, 2H), 0.93 (t, 3H). $^{11}$B NMR (DMSO-d$_6$, 128.4 MHz) ppm: 1.24. $^{19}$F NMR (DMSO-d$_6$, 376 MHz) δ ppm: −167.76 (t, $^2J_{HF}$=32.72), −165.09 (t, $^2J_{FF}$=30.42). $^7$Li NMR (DMSO-d$_6$, 155.4 MHz) δ ppm: −0.82.

The above NMR measurements were performed using a 9.4 Tesla Bruker® Avance NMR spectrometer at Larmor frequencies of 400.1, 376.4, 155.3, and 128.4 MHz for $^1$H, $^{19}$F, $^7$Li, and $^{11}$B, respectively. The chemical shifts of the proton NMR spectra were reported in ppm relative to tetramethylsilane (TMS) or residual protiated solvent peaks in $^1$H NMR spectra. LiCl, BF$_3$.Et$_2$O, and CF$_3$Cl in DMSO-d$_6$ were used as a secondary external standard for $^7$Li, $^{11}$B, and $^{19}$F NMR, respectively. Sample temperature was controlled by a resistance heater in the probe using air for the heat transfer gas. Sample temperatures were calibrated with 100% ethylene glycol according to the temperature calibration manual.

The key intermediates for the synthesis of LiBMFMB, LiBPFMB, and LiDFPFMB are the corresponding bis(trimethylsilyl) malonates. Although the synthesis of LiBFMB (of the art) also proceeds through a bis(trimethylsilyl) malonate intermediate (e.g., Liao, C., et al., *Adv. Energy Mater.*, 2014. 4: p. 1301368, 1-12), the synthesis of the three malonatoborate lithium salts described above employed trimethylsilyl chloride as both reagent and solvent, in contrast to the synthesis of LiBFMB, which employed 3-(trimethylsilyl)-2-oxazolidinone as the source of the trimethylsilyl functional group. To push the esterification as complete as possible, the unreacted trimethylsilyl chloride and trapped HCl were removed under vacuum after overnight reaction, and fresh trimethylsilyl chloride was added. The foregoing process was repeated until the $^1$H NMR showed no signal from the acid or until the best ratio of product was achieved. Bis(trimethylsilyl) malonates were obtained after distillation under vacuum, and further reacted with lithium tetramethylborate in anhydrous acetonitrile under an inert atmosphere to obtain the final LiBMFMB and LiBPFMB lithium salts.

It was observed that the reaction between trimethylsilyl chloride and 2-propyl-2-fluoromalonic acid could be pushed to completion easily. However, the synthesis of 2-methyl-2-fluoromalonic acid was more difficult, since there was consistently encountered a mixture of unreacted acid, monotrimethylsilyl malonate, and bis(trimethylsilyl) malonates, even after repeated distillation. Fortunately, during the final synthesis of the lithium salt, LiBMFMB, the product from monotrimethylsilyl malonate and lithium tetramethylborate was not soluble in anhydrous acetonitrile and could be easily removed by filtration. The unreacted acid was easily removed by repeated washing with dry ether, in which LiBMFMB was not soluble. High purity lithium salts of LiBMFMB and LiBPFMB were obtained by repeated recrystallization from anhydrous acetonitrile and toluene.

As in the case of LiBFMB (of the art), the residual acetonitrile or ether trapped in the new salts described herein were removed by exchanging with carbonate solvent during the preparation of salt solutions. Thus, the calculated amount of anhydrous lithium salts was dissolved in EC/DMC in an argon-filled glove box and the solution was then subjected to high vacuum treatment (10 mtorr) at 50° C. overnight, after which only EC was left. Based on the integration of the $^1$H NMR peaks for the lithium salts and EC, the calculated amounts of EC and EMC were subsequently added to prepare standard EC/EMC (½ by wt.) solutions of 0.8 M LiBMFMB, 0.8M LiBPFMB and 1.0M LiDFPFMB.

Characterization of the New Lithium Salts

The calculated amount of anhydrous lithium salt was dissolved in EC/DMC in an argon-filled glovebox, and the solution was then subjected to high vacuum treatment (10 mtorr) at 50° C. overnight, after which only EC was left. Based on the integration of the $^1$H NMR peaks for the lithium salts and EC, the calculated amounts of EC and EMC were subsequently added to prepare standard EC/EMC (½ by wt.) solutions of 0.8 M LiBMFMB, 0.8M LiBPFMB and 1.0M LiDFPFMB. A cathode composite electrode was prepared by casting a well-homogenized slurry of cathode (LiNi$_{0.5}$Mn$_{1.5}$O$_4$, LiCoO$_2$, LiMn$_2$O$_4$) (80 wt %), carbon black (10 wt %), and PVdF (10 wt %) in N-methylpyrrolidone (NMP) on aluminum foil with a doctor blade. A graphite electrode was prepared by casting a well-homogenized slurry of graphite (85 wt %), carbon black (5 wt %), and PVdF (10 wt %) in N-methylpyrrolidone (NMP) on copper foil with a doctor blade. After solvent evaporation, the electrodes were cut into discs with a diameter of 12 mm and further dried at 110° C. for 24 hours. All the samples for the electrochemical tests were assembled in a glove box with oxygen and moisture level below 0.5 ppm. The coin cells were cycled on an Arbin® instrument between 3.0 and 5.0 V for LiNi$_{0.5}$Mn$_{1.5}$O$_4$, 3.0 and 4.2 V for both LiCoO$_2$ and LiMn$_2$O$_4$, and between 0.005 and 2.0 V for graphite electrode under different current rates. CV data were recorded with respective cathodes or graphite as the working electrode and lithium as both counter and reference electrode under a scan rate of 0.1 mV s$^{-1}$. The bulk ionic conductivity of the electrolyte solutions was measured as previously described (e.g., Sun, X. G., et al., *J. of Power Sources*, 2013. 237: p. 5-12). Electrochemical impedance spectroscopy was measured on a Gamry™ Instrument in the frequency range from $3\times10^5$ Hz to 1 Hz with a perturbation amplitude of 10 mV.

Ionic Conductivity

FIG. 1 shows the temperature dependence of the ionic conductivities of different lithium salts in a mixture of ethylene carbonate (EC) and ethyl methyl carbonate (EMC) (EC: EMC=1:2, in wt.). The ionic conductivity follows the order of LiPF$_6$>LiBOB>LiBMFMB>LiBPFMB>LiDFPFMB, which is similar to previously observed trend for LiPF$_6$ and LiBOB (Liao et al., 2014, supra; and, Ding, M. et al., *J. of Electrochem. Soc.*, 2004. 151: p. A2007-A2015). The lower ionic conductivities of LiBMFMB, LiBPFMB and LiDFPFMB compared to LiBOB is mainly due to the lower mobility of the larger anions than that of the BOB anion. The ionic conductivities at 25° C. for 1.0M LiPF$_6$, 1.0M LiBOB, 0.8M LiBMFMB, 0.8M LiBPFMB, and 1.0M LiDFPFMB are $7.5\times10^{-3}$, $4.2\times10^{-3}$, $2.43\times10^{-3}$, $2.12\times10^{-3}$, and $1.06\times10^{-3}$ S cm$^{-1}$, respectively. For the same reason (i.e., larger anion and lower mobility), the ionic conductivities of LiBMFMB, LiBPFMB and LiDFPFMB are also lower than that of LiBFMB (Liao et al., 2014, supra).

Cyclic Voltammetry

Figure 2A:
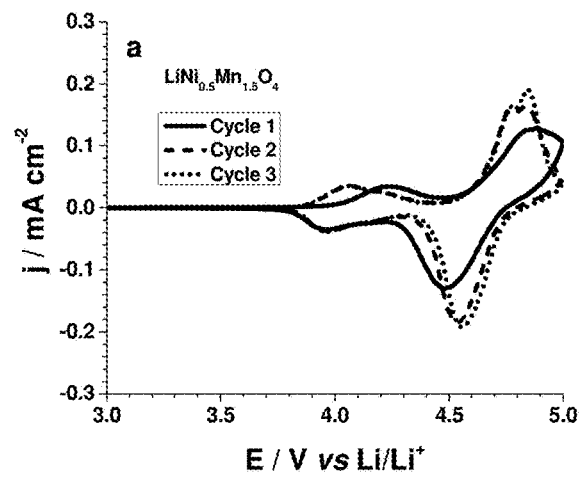
FIGS. 2A-2C. Cyclic voltammograms (CVs) of 0.8M LiBMFMB/EC-EMC (½, by wt.) using (a) $LiNi_{0.5}Mn_{1.5}O_4$ (FIG. 2A), (b) $LiCoO_2$ (FIG. 2B), and (c) graphite as working electrode and lithium as both counter and reference electrode (FIG. 2C), at a scan rate of 0.1 mV/s.

FIG. 2A shows the cyclic voltammograms (CVs) of 0.8M LiBMFMB/EC-EMC (½, by wt.) on a LiNi$_{0.5}$Mn$_{1.5}$O$_4$ working electrode with lithium as both counter and reference electrode at a scan rate of 0.1 mV/s. In the initial anodic scan there is one minor oxidation peak at about 4.2 V and one major oxidation peak at about 4.9 V, corresponding to the oxidation of Mn$^{3+}$ to Mn$^{4+}$ and Ni$^{2+}$ to Ni$^{4+}$, respectively. During the cathodic scan, the two reduction peaks appear at 4.6 and 3.9 V respectively. There is a 0.3 V difference for the two redox processes, which could be attributed to the lower ionic conductivity of the electrolyte as compared to that of the LiPF$_6$ solution, as shown in FIG. 1. After the initial CV scan, the difference between the anodic peak and cathodic peak becomes smaller, which indicates that there is an activation process within the electrode. In addition, during the second CV cycle, two anodic peaks corresponding to the oxidation of Ni$^{2+}$ to Ni$^{3+}$ and Ni$^{3+}$ to Ni$^{4+}$ are clearly observed. However, the two corresponding cathodic peaks are still overlapped to a broad peak because of the very narrow potential gap between the two peaks.

Figure 2B:
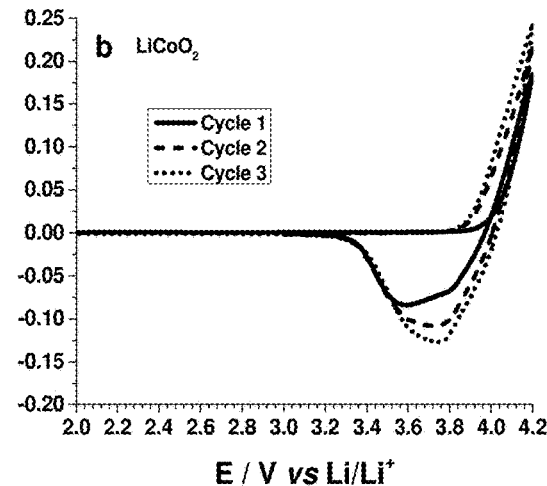

FIG. 2B shows the CVs of LiBMFMB on a LiCoO$_2$ working electrode. During the initial anodic scan, the onset oxidation (due to lithium de-intercalation) starts at 3.9 V while two reduction peaks during the lithium intercalation process appear at 3.78 and 3.58 V. The two-redox process has previously been observed with the thin-film LiCoO$_2$ electrode and was attributed to the order—disorder phase transition and the first-order phase transition between two hexagonal phases, respectively (Shin, H., C. and S. I. Pyun, *Electrochimica Acta*, 2001. 46(16): p. 2477-2485; Kim, Y. J., et al., *Chem. Mater.*, 2003. 15(7): p. 1505-1511). During the following two CV scans the onset oxidation was lowered to 3.8V, which indicates improved kinetics due to reduced electrode polarization. It is also noted that the anodic peak current was larger than the cathodic peak current and that the shape of the anodic and cathodic current peaks was clearly asymmetric. The asymmetry in shape and the difference in value between anodic and cathodic peak currents had also been previously observed in other systems; however, the cause is not completely understood (Shin and Kim, supra).

Figure 2C:
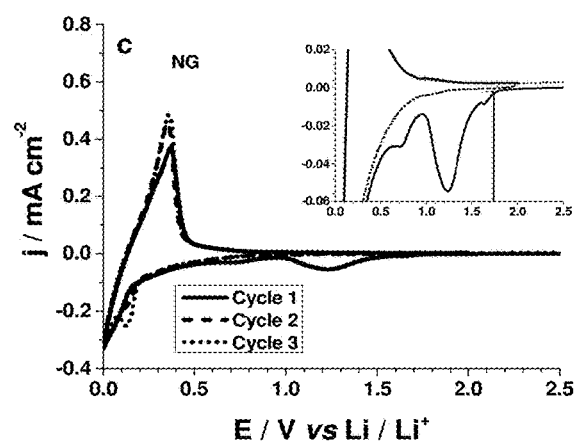

The CVs on a graphite working electrode are shown in FIG. 2C. During the initial cathodic scan, the onset reduction starts at 1.75 V (inset), which could be attributed to the typical reduction of the BMFMB anion, similar to those observed for the BOB anion (Xu, et al., *Electrochem. Solid-State Lett.,* 2003. 6(6): p. A117-A120). A large reduction peak was observed at 1.2 V and a smaller one at 0.75 V, which could be attributed to the reduction of the carbonate solvents on the surface of the graphite electrode and those intercalated with lithium into the graphene layer, respectively. These reduction peaks disappear in the following cycles, indicating the effective passivation of the graphite electrode. As a result, the current density of lithium de-intercalation increases with cycling, and with increased coulombic efficiencies.

Figure 3A:
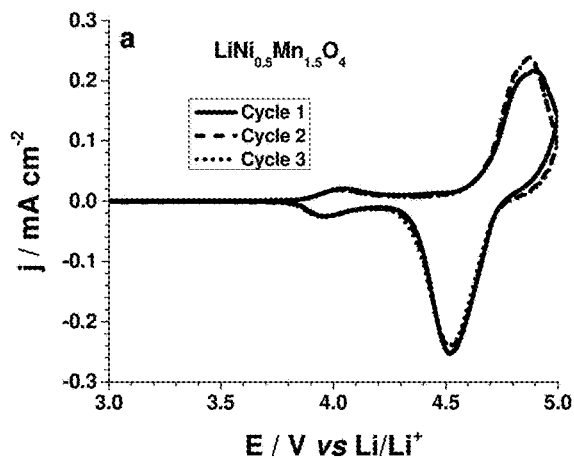
FIGS. 3A-3C. Cyclic voltammograms of 0.8M LiBPFMB/EC-EMC (½, by wt.) using (a) $LiNi_{0.5}Mn_{1.5}O_4$ (FIG. 3A), (b) $LiCoO_2$ (FIG. 3B), and (c) graphite as working electrode and lithium as both counter and reference electrode (FIG. 3C), at a scan rate of 0.1 mV/s.

FIG. 3A shows the CVs of 0.8M LiBPFMB/EC-EMC (½, by wt.) on a $LiNi_{0.5}Mn_{1.5}O_4$ working electrode with lithium as both counter and reference electrode at a scan rate of 0.1 mV/s. Similar to that of LiBMFMB, during the anodic scan process, one minor oxidation peak at about 4.0 V corresponding to the oxidation of $Mn^{3+}$ to $Mn^{4+}$ and one major oxidation peak at about 4.91 V corresponding to the oxidation $Ni^{2+}$ to $Ni^{4+}$ were observed. During the cathodic scan the two correspondingly reduction peaks appear at 3.9 and 4.5 V, respectively. After the initial CV scan, the high potential anodic peak was lowered to 4.87 V, indicating reduced polarization within the electrode. However, unlike the case of LiBMFMB, only one set of broad redox peak was observed at high potential, mainly because the electrode polarization and the very narrow potential gap between the two oxidation steps of $Ni^{2+}$ to $Ni^{3+}$ and $Ni^{3+}$ to $Ni^{4+}$.

Figure 3B:
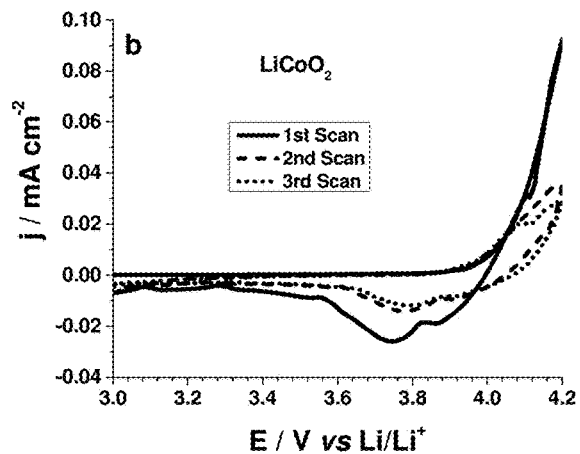

FIG. 3B shows the CVs of LiBPFMB on a $LiCoO_2$ working electrode. It is observed that there are two lithium intercalation peaks at 3.87 and 3.74 V, which can be attributed to the order-disorder phase transition and the first-order phase transition between two hexagonal phases, respectively (Shin and Kim, supra). During the following CV scans, the two lithium intercalation peaks increased to 3.92 and 3.79V, respectively, which is attributed to the improved kinetic due to reduced polarization. In the third CV scan, two redox processes are clearly seen for both oxidation and reduction. It was also observed that the anodic peak current was larger than the cathodic peak current and that the shape of the anodic and cathodic current peaks was clearly asymmetric. The asymmetry in shape and the difference in value between anodic and cathodic peak currents had also been observed in other systems; however, the cause is not completely understood (Shin and Kim, supra).

Figure 3C:
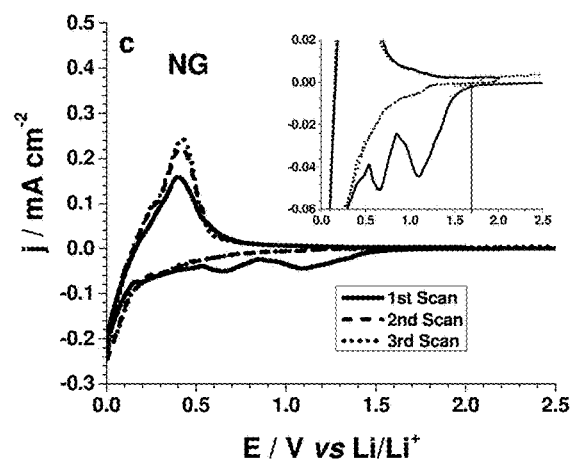

The CVs on a graphite working electrode are shown in FIG. 3C. During the cathodic scan, the reduction process starts at 1.70V (inset), which could be attributed to the reduction of the BPFMB anion, similar to that observed for BOB anion. There is a large reduction peak at 1.1 V and a small one at 0.65 V, which could be attributed to the reduction of the carbonate solvents on the surface of the graphite electrode and those intercalated with lithium into the graphene layer, respectively. The reduction peaks disappear during the following cycles, indicating the effective passivation of the graphite electrode. As a result, the current density of lithium de-intercalation increases with cycling, and with increased coulombic efficiencies.

FIG. 4A shows the CVs of 1.0M LiDFPFMB/EC-EMC (½, by wt.) on a $LiNi_{0.5}Mn_{1.5}O_4$ working electrode with lithium as both counter and reference electrode at a scan rate of 0.1 mV/s. Unlike the CV for LiBMFMB and LiBPFMB in which only one set of redox peak around 4.0 V corresponding to the oxidation of $Mn^{3+}$ to $Mn^{4+}$ was observed in the low voltage range, two pairs of peaks at 4.18 and 4.3 V on oxidation and 3.9 and 3.8 V on reduction during the first CV scan were observed for LiDFPFMB. The two pairs of peaks indicate a two-stage process of lithium insertion and extraction in the spinel structure, which is associated with a structure ordering when lithium ions occupy one half of the tetrahedral 8a sites (Thackeray, M. M., *Prog. Solids. Chem.,* 1997. 25: p. 1-71; Rougier, A., et al., *J. Electrochem. Soc.,* 1998. 145(9): p. 2975-2980). The two peaks are shifted to 4.09 and 4.23 V on oxidation and 4.07 and 3.92 V on reduction during the second CV scan, and further shifted to 4.08 and 4.16 V on oxidation and 3.94 and 3.87 V on reduction during the third CV scan. Of further note in FIG. 4A, the two sets of redox peaks at high potential corresponding to the oxidation of $Ni^{2+}$ to $Ni^{3+}$ and $Ni^{3+}$ to $Ni^{4+}$ are observed. During the first CV scan, there are two peaks at 4.61 and 4.87 V on oxidation and at 4.37 and 4.24 V on reduction, which are shifted to 4.63 and 4.81 V on oxidation and 4.41 and 4.32 V on reduction during the second CV scan, and further shifted to a barely visible peak at 4.65 and a well-defined peak at 4.79 V on oxidation and 4.52 and 4.33 V on reduction during the third CV scan. The decrease in the potential difference between oxidation and reduction in both low and high potentials with cycling indicates that the electrode kinetics improves due to the reduced polarization.

FIG. 4B shows the CVs of LiDFPFMB on a $LiCoO_2$ working electrode. During the initial CV scan, one peak at 4.12 V on oxidation and two peaks at 4.0 and 3.8 V on reduction were observed. However, during the following CV scans, two peaks at 4.11 and 4.16 V oxidation were observed. The two set of redox peaks can be attributed to the order-disorder phase transition (high potential set) and the first-order phase transition (low potential set) between two hexagonal phases, respectively. Another feature about the $LiCoO_2$ CVs is that the anodic peak current is larger than the cathodic peak current, and the shape of the anodic and cathodic current peaks is clearly asymmetric. As mentioned above, the asymmetry in shape and the difference in value between anodic and cathodic peak currents have been observed in other systems, but the cause is not completely understood.

The CVs on a graphite working electrode is shown in FIG. 4C. During the initial cathodic scan, the reduction starts at 1.72 V (inset), which could be attributed to the typical reduction of the DFPFMB anion, similar to those observed for the BOB anion. There is a large reduction peak at 1.1 V and a small peak at 0.70 V, which could be attributed to the reduction of the carbonate solvents on the surface of graphite electrode and those intercalated with lithium into the graphene layer, respectively. The reduction peaks disappear during the following cycles, indicating the effective passivation of the graphite electrode. As a result, the current density of lithium de-intercalation increases with cycling, and with increased coulombic efficiencies.

Figure 5A:
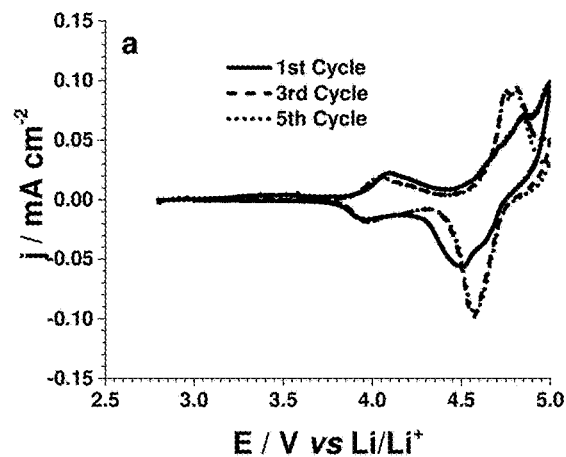
FIGS. 5A-5C. Cyclic voltammograms of the $LiNi_{0.5}Mn_{1.5}O_4$||Li half-cell in (a) 1.0 M LiDFMFMB (FIG. 5A), (b) 1.0M LiDFEFMB (FIG. 5B) and (c) 1.0 M LiDFPFMB (FIG. 5C) in EC-EMC (½ by wt.) at a scan rate of 0.05 mV/s. Lithium was used as both counter and reference electrode.
Figure 5B:
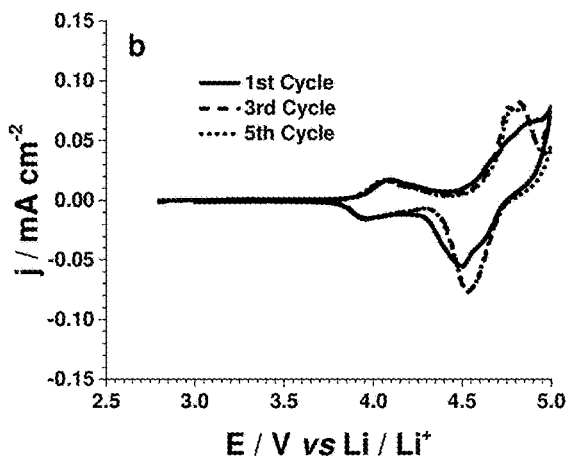
Figure 5C:
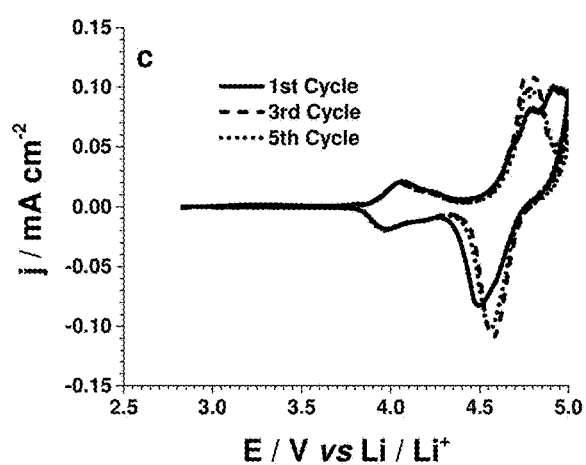

FIGS. 5A, 5B and 5C show the CVs of 1.0 M solution of LiDFMFMB, LiDFEFMB, and LiDFPFMB in EC-EMC (½, by wt.) on a $LiNi_{0.5}Mn_{1.5}O_4$ working electrode at a scan rate of 0.05 mV/s, respectively. In the initial anodic scan there is one minor oxidation peak at 4.10 V and two major oxidation peaks at 4.72-4.79 V, and 4.85-4.92 V, corresponding to the oxidation of $Mn^{3+}$ to $Mn^{4+}$ and $Ni^{2+}$ to $Ni^{4+}$, respectively. The high current at 5.0 V is clearly due to the oxidation of the carbonate solvents, forming the SEI layers on the surface of the cathdoes. In the cathodic scan the two major reduction peaks appear at 4.62 and 4.50 V while the minor reduction peak appears at 3.95 V. During the following cycles, the major oxidation appear as two well-defined double peaks at 4.75 and 4.82 V, respectively; however, the two major reduction peaks merge as single peak at 4.55 V.

It is also noticed that the current densities for both lithium intercalation and de-intercalation at high potential, particularly those of the de-intercalation current densities, increase with cycling, suggesting improved coulombic efficiencies after SEI formation.

Figure 6A:
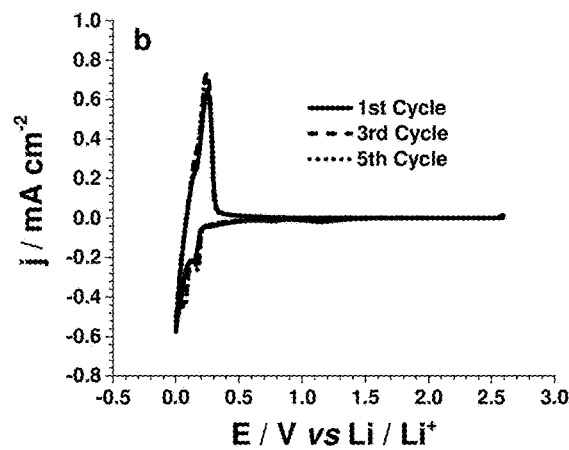
FIGS. 6A-6C. Cyclic voltammograms of the NG||Li half-cell in (a) 1.0M LiDFMFMB (FIG. 6A), (b) 1.0M LiDFEFMB (FIG. 6B), and (c) 1.0 M LiDFPFMB (FIG. 6C) in EC-EMC (½ by wt.) at a scan rate of 0.05 mV/s. Lithium was used as both counter and reference electrode.
Figure 6B:
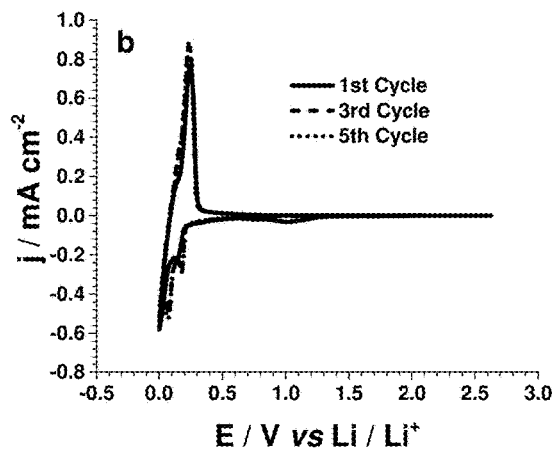
Figure 6C:
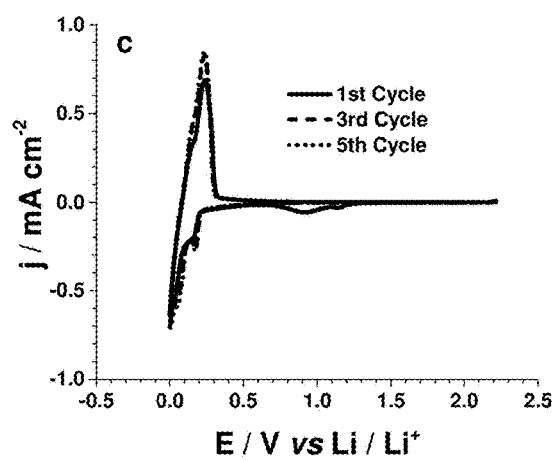

FIGS. 6A, 6B and 6C show the CVs of 1.0 M solution of LiDFMFMB, LiDFEFMB, and LiDFPFMB in EC-EMC (½, by wt.) on a graphite working electrode at a scan rate of 0.05 mV/s, respectively. Clearly these new salts are compatible with graphite electrode, showing well-defined lithium intercalation and extractions peaks below 0.25 V vs Li/Li$^+$.

Cell Cycling Performance

Figure 7A:
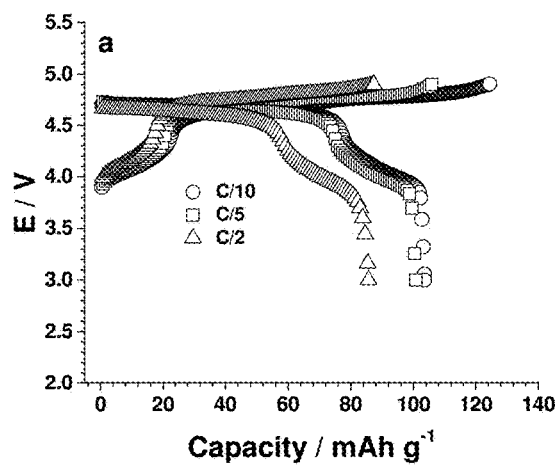
FIGS. 7A-7C. Charge-discharge profiles (FIG. 7A), cycling performance and coulombic efficiencies (FIG. 7B), and electrochemical impedance spectroscopy (FIG. 7C) of $LiNi_{0.5}Mn_{1.5}O_4$||Li cell using 0.8M LiBMFMB/EC-EMC (½ by wt.) at different current rates.

FIG. 7A shows the charge-discharge profiles of Li/LiNi$_{0.5}$Mn$_{1.5}$O$_4$ cells based on 0.8 M LiBMFMB/EC-EMC (½, by wt.) under different current rates. The typical two-step charge/discharge process is observed under all current rates, which is similar to the CV obtained in FIG. 2A. The initial charge (de-intercalation) and discharge (intercalation) capacities of the cell are 124.5 and 103.5 mAh g$^{-1}$ under C/10, 105.8 and 100.7 mAh g$^{-1}$ under C/5, and 87.4 and 85.7 mAh g$^{-1}$ under C/2.

Figure 7B:
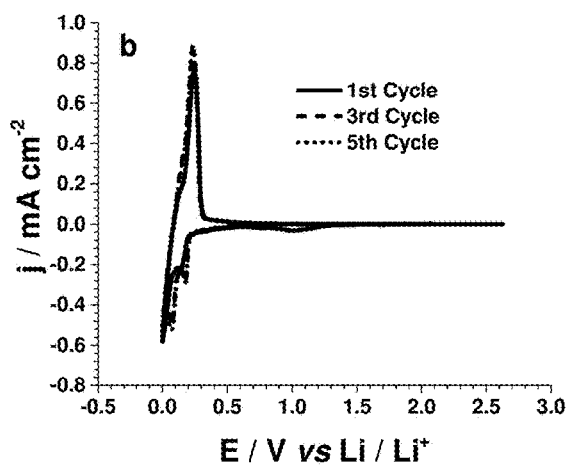

FIG. 7B shows the cycling performance and coulombic efficiencies of the LiNi$_{0.5}$Mn$_{1.5}$O$_4$‖Li cells cycled under different current rates. During the first five cycles at C/10, the charge capacity decreases from 124.5 to 111.5 mAh g$^{-1}$ while the discharge capacity initially increases from 103.5 to 104.5 and then decreases to 102.5 mAh g$^{-1}$, resulting in gradual increase of coulombic efficiency from initial 83.1 to 92%. The initial low coulombic efficiency is mainly due to electrolyte oxidation under a high voltage of 4.7 V and the formation of an SEI layer on the cathode surface (Xu, K., *Chem. Rev.*, 2004. 104: p. 4303-4417). When the current rate is increased to C/5, the charge and discharge capacities are stabilized at 105 and 101 mAh g$^{-1}$, respectively, with the coulombic efficiency immediately increased to 95.2%. The charge and discharge capacities gradually decrease with cycling and are stabilized at 96.2 and 93.9 mAh g$^{-1}$ after 50 cycles, with coulombic efficiency stabilized at 97.5%. When the current rate is further increased to C/2, the reversible capacities are still as high as 84 mAh g$^{-1}$ with a high coulombic efficiency of 99%. When the current is reduced back to C/5, the capacities are also recovered, as shown in FIG. 7B. It is observed that the above cycling behavior of LiNi$_{0.5}$Mn$_{1.5}$O$_4$ with 0.8M LiBMFMB/EC-EMC is much better than that with 0.5 M LiBFMB/EC-DMC-DEC and 1.0M LiBFMB/PC (Liao et al., 2014, supra) which could be attributed to the stable structure of LiBMFMB by replacing the acidic hydrogen of LiBFMB with a methyl group, which in turn results in less electrolyte decomposition and SEI formation. The latter conclusion can be confirmed by the measurement of the electrochemical impedance spectroscopy of the cell.

Figure 7C:
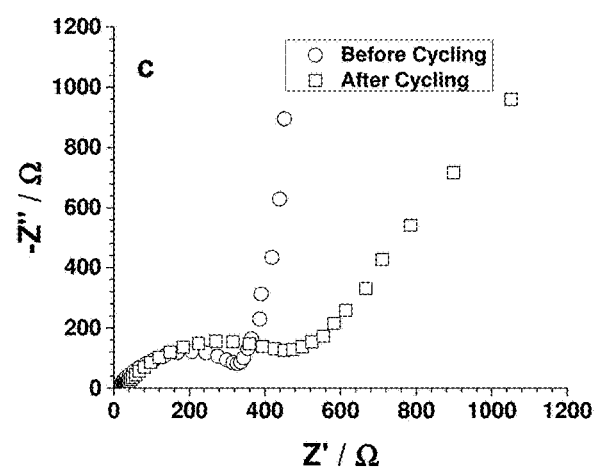

As shown in FIG. 7C, the total impedance of the LiNi$_{0.5}$Mn$_{1.5}$O$_4$‖Li cell, including both resistance of the SEI layer and the charge-transfer resistance on both electrodes, only increases from 327Ω before cycling to 474Ω after 100 cycles. As a comparison, the total impedance of LiNi$_{0.5}$Mn$_{1.5}$O$_4$‖Li cell with 0.5M LiBFMB/EC-DMC-DEC electrolyte was increased from 1028Ω before cycling to 11084Ω after 21 cycles, and the impedance of the cell with 1.0M LiBFMB/PC electrolyte was increased from 162Ω before cycling to 1900Ω after 30 cycles.

Figure 8A:
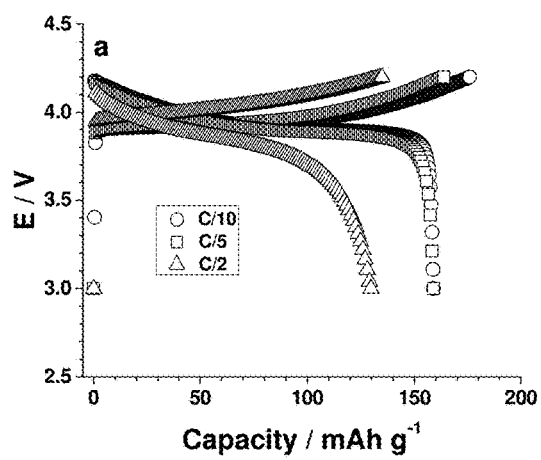
FIG. 8A-8C. Charge-discharge profiles (FIG. 8A), cycling performance and coulombic efficiencies (FIG. 8B), and electrochemical impedance spectroscopy (FIG. 8C) $LiCoO_2$||Li cell using 0.8M LiBMFMB/EC-EMC (½ by wt.) at different current rates.
Figure 8B:
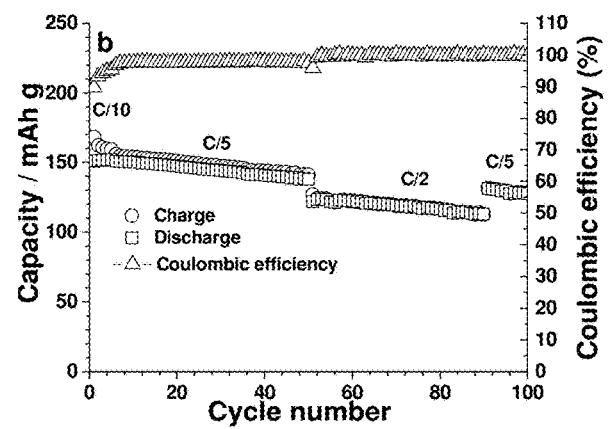
Figure 8C:
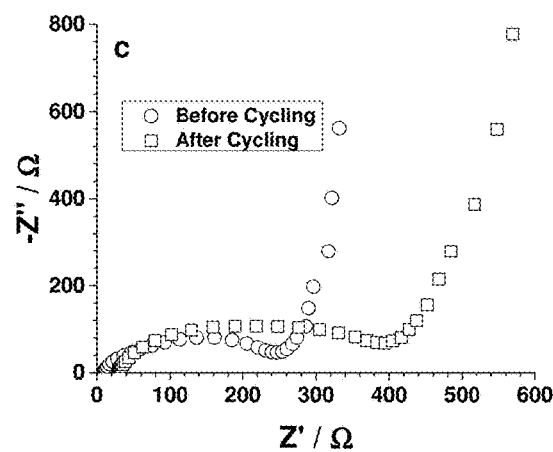

FIGS. 8A and 8B show the charge-discharge profiles and cycling performance as well as coulombic efficiencies of the LiCoO$_2$‖Li cell using 0.8 M LiBMFMB/EC-EMC (½, by wt.) under different current rates, respectively. Under a current rate of C/10, the initial charge and discharge capacities were 168 and 151 mAh g$^{-1}$, respectively, resulting in an initial coulombic efficiency of 89.9%. The charge capacity decreased to 159 mAh g$^{-1}$ while the discharge capacity increased to 152 mAh g$^{-1}$ after 5 cycles, with the coulombic efficiency increased to 95.6%. When the current rate was increased to C/5, the charge and discharge capacity were slightly decreased to 155.7 and 150.8 mAh g$^{-1}$, respectively, with the coulombic efficiency further increased to 96.9%. The charge and discharge capacities gradually decreased with cycling and then stabilized at 141.2 and 137.8 mAh g$^{-1}$ after 50 cycles, with coulombic efficiency stabilized at 97.6%. When the current rate was increased to C/2, the charge and discharge capacities were decreased to 126.9 and 121.7 mAh g$^{-1}$, respectively. The charge and discharge capacities gradually decrease to 112.7 mAh g$^{-1}$ after 40 cycles with coulombic efficiency close to 100%. When the current was reduced back to C/5, the reversible capacity was also recovered back to 130 mAh g$^{-1}$. The good cycling performance of the LiCoO$_2$‖Li cell is also supported by the slow increase of the electrochemical impedance spectroscopy. As also shown in FIG. 8C, the total impedance of the LiCoO$_2$‖Li system increases from 247Ω before cycling to 394Ω after 100 cycles.

Figure 9C:
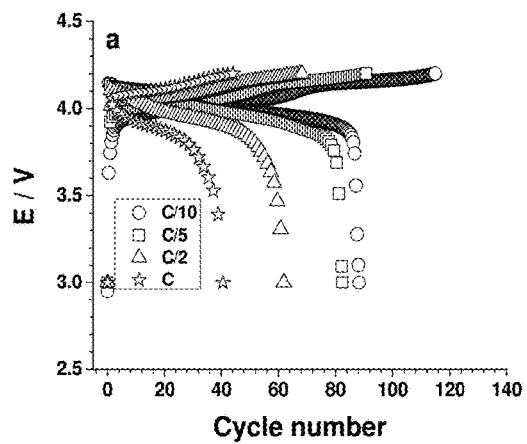
Figure 9C:
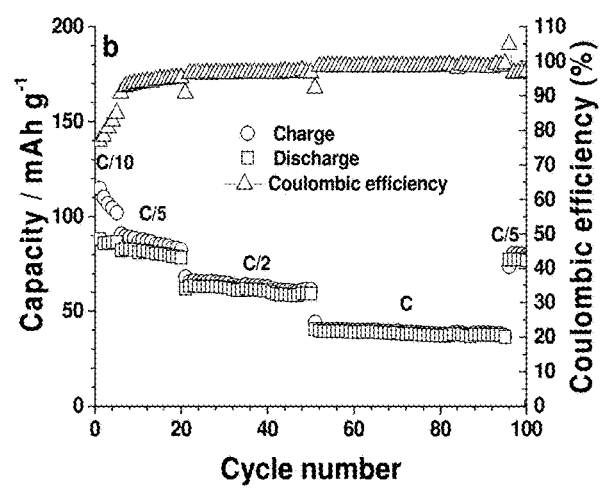
Figure 9C:
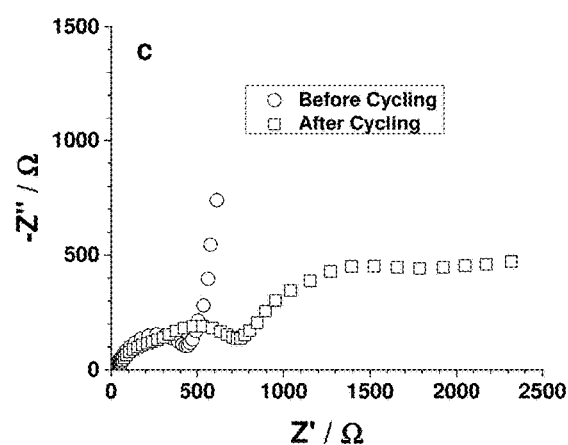

FIGS. 9A and 9B show the charge-discharge profiles and cycling performance and coulombic efficiencies of LiMn$_2$O$_4$‖Li cells based on 0.8 M LiBMFMB/EC-EMC (½, by wt.) at different current rates, respectively. Under a current rate of C/10, the initial charge and discharge capacities were 115 and 88 mAh g$^{-1}$, resulting in an initial low coulombic efficiency of 76.5%. The charge capacity decreases to 102 mAh g$^{-1}$ while the discharge capacity decreases to 87 after 5 cycles, with the coulombic efficiency increased to 85.3%. When the current rate was increased to C/5, the charge and discharge capacities were slightly decreased to 90.7 and 82.3 mAh g$^{-1}$, respectively, with coulombic efficiency immediately increased to 90.7%. The charge and discharge capacities gradually decrease with cycling and were stabilized at 82.5 and 78.6 mAh g$^{-1}$ after 20 cycles, with coulombic efficiency increased to 95.3%. When the current rate was increased to C/2, the charge and discharge capacities decreased to 68.3 and 59.2 mAh g$^{-1}$, and gradually decreased to 60 mAh g$^{-1}$ after 30 cycles, with coulombic efficiency increased to 97%. When the current rate was further increased to C, the charge and discharge capacities decreased to 44 and 40.6 mAh g$^{-1}$, respectively, and then gradually decreased to 36 mAh g$^{-1}$ after 45 cycles, with coulombic efficiency close to 99%. When the current is reduced back to C/5, the reversible capacity was also recovered back to 80 mAh g$^{-1}$. It should be mentioned that the lower capacities of LiMn$_2$O$_4$‖Li cell than those of LiCoO$_2$‖Li using the same electrolyte is mainly because the electrode in the former cell contains more active material (2.5 mg) than that in the latter cell (1.5 mg). Theoretically, both active materials have similar practical capacity; therefore, under the same nominal current rate higher current is used for the LiMn$_2$O$_4$‖Li cell and lower capacity is obtained. FIG. 9C also shows the comparison of the electrochemical impedance spectroscopy of the LiMn$_2$O$_4$‖Li cell before and after cycling. The total impedance of the LiMn$_2$O$_4$‖Li cell is increased from 430Ω before cycling to 2100Ω after 100 cycles, indicating more severe electrolyte decomposition under higher current rates.

Figure 10A:
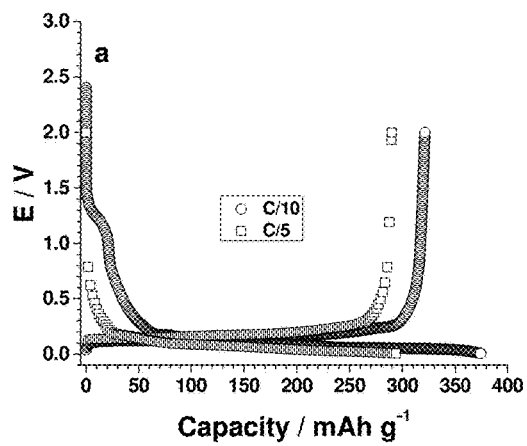
FIGS. 10A-10C. Charge-discharge profiles (FIG. 10A), cycling performance and coulombic efficiencies (FIG. 10B), and electrochemical impedance spectroscopy (FIG. 10C) of NGμLi cell using 0.8M LiBMFMB/EC-EMC (½ by wt.) at different current rates.
Figure 10B:
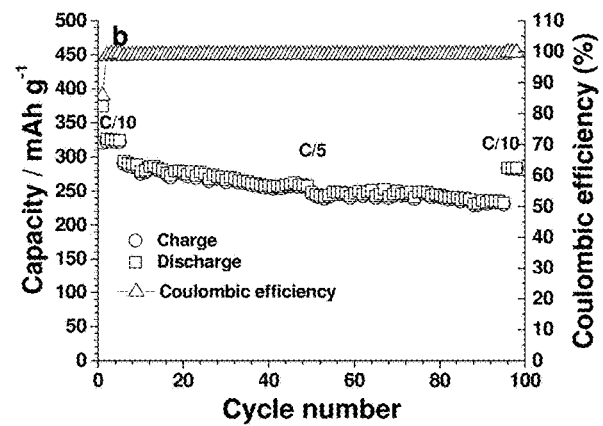
Figure 10C:
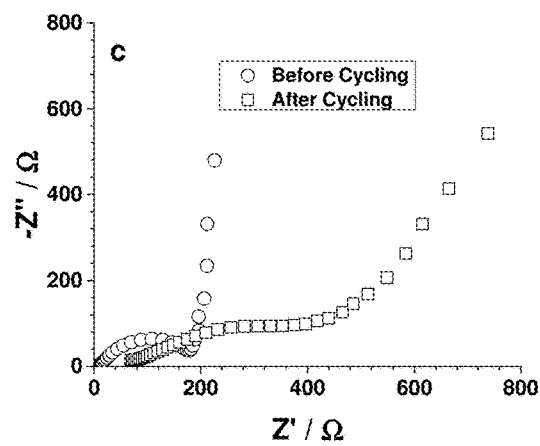

FIG. 10A shows the charge-discharge profiles, and FIG. 10B shows the cycling performance and coulombic efficiencies of NG‖Li cells based on 0.8 M LiBMFMB/EC-EMC (½, by wt.) under different current rates. Under a current rate of C/10, the initial charge and discharge capacities were 321 and 374.6 mAh g$^{-1}$, resulting in an initial coulombic efficiency of 85.7%. The charge capacity increased to 322.4 mAh g$^{-1}$ while the discharge capacity decreased to 324.3 after 5 cycles, with the coulombic efficiency quickly increased to 99.4%. When the current rate was increased to C/5, the charge and discharge capacities slightly decreased to 289.8 and 293.8 mAh g$^{-1}$, respectively, which gradually decreased with cycling and stabilized at 230.5 and 232.7 mAh g$^{-1}$ after 90 cycles, with coulombic efficiency stabilized at 99%. When the current was reduced back to C/10, the reversible capacity was recovered to 284 mAh g$^{-1}$. FIG. 10C also shows the comparison of the electrochemical impedance spectroscopy of the NG∥Li cell before and after cycling. The total impedance of the NG∥Li cell is increased from 175Ω before cycling to 370Ω after 100 cycles. The significance of replacing the acidic hydrogen with a methyl group in LiBMFMB is reflected in the good cycling performance of NG∥Li cell, compared to the severe decomposition in 0.5M LiBFMB/EC-DMC-DEC electrolyte that prevented the cell from cycling.

Figure 11A:
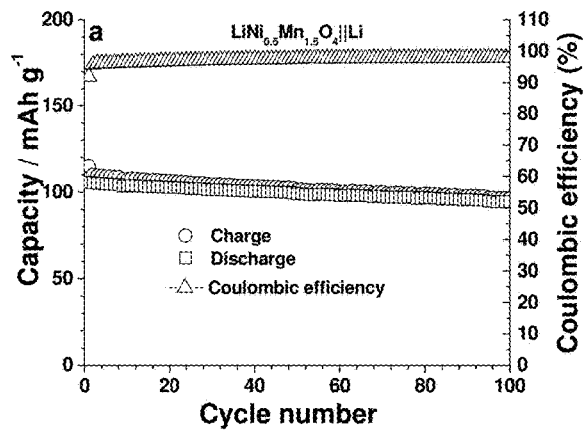
FIGS. 11A-11F. Cycling performance and electrochemical impedance spectroscopy of $LiNi_{0.5}Mn_{1.5}O_4$||Li (FIGS. 11A and 11B, respectively), $LiCoO_2$||Li (FIGS. 11C and 11D, respectively), and NG∥Li cell (FIGS. 11E and 11F, respectively) using 0.8M LiBPFMB/EC-EMC (½ by wt.) at a current rate of C/10.
Figure 11B:
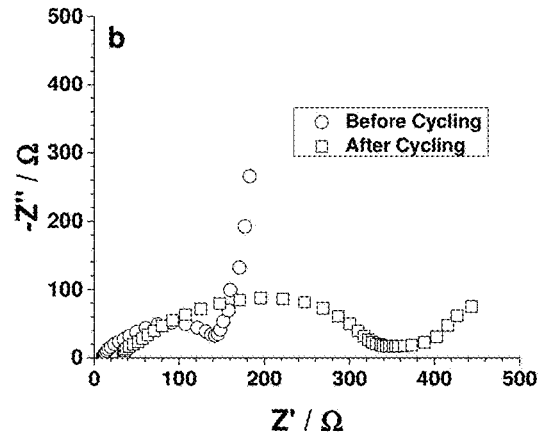

FIG. 11A shows the cycling performance and coulombic efficiencies of LiNi$_{0.5}$Mn$_{1.5}$O$_4$∥Li cells using 0.8 M LiBPFMB/EC-EMC (½, by wt.) under a current rate of C/10. The initial charge and discharge capacities were 105.7 and 115 mAh g$^{-1}$, respectively, resulting in an initial high coulombic efficiency of 91.9%. The charge and discharge capacities gradually decreased with cycling, with coulombic efficiency increased to 96% during the second cycle and maintained at 98% during the following cycles. The reversible capacity was still as high as 95 mAh g$^{-1}$ after 100 cycles. As also shown in FIG. 11B, the total impedance of the cell increased from 128Ω before cycling to 330Ω after 100 cycles.

Figure 11C:
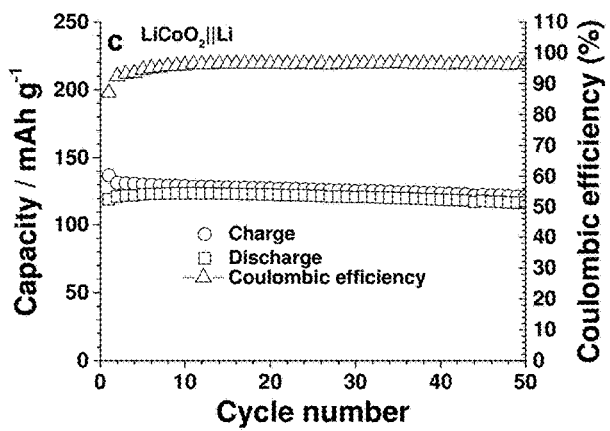
Figure 11D:
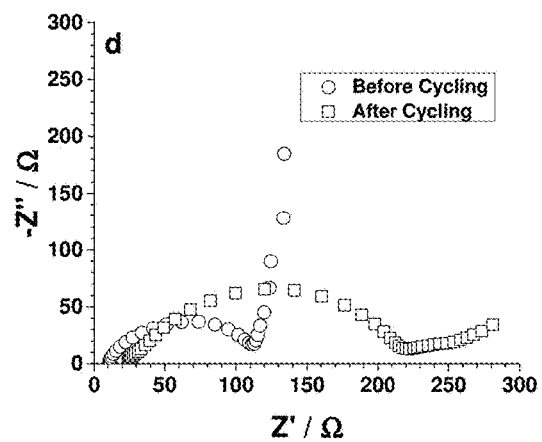

FIG. 11C shows the cycling performance and coulombic efficiencies of LiCoO$_2$∥Li cells based on using 0.8 M LiBPFMB/EC-EMC (½, by wt.) under a current rate of C/10. The initial charge and discharge capacities were 137 and 119 mAh g$^{-1}$ with a coulombic efficiency of 86.9%. The charge capacity gradually increases to 123.8 mAh g$^{-1}$ first and then gradually decrease with cycling, whereas the discharge capacity gradually decreased with cycling. The reversible capacity was still as high as 117 mAh g$^{-1}$ after 50 cycles. As also shown in FIG. 11D, the total impedance of the cell increased from 100Ω before cycling to 196Ω after 50 cycles.

Figure 11E:
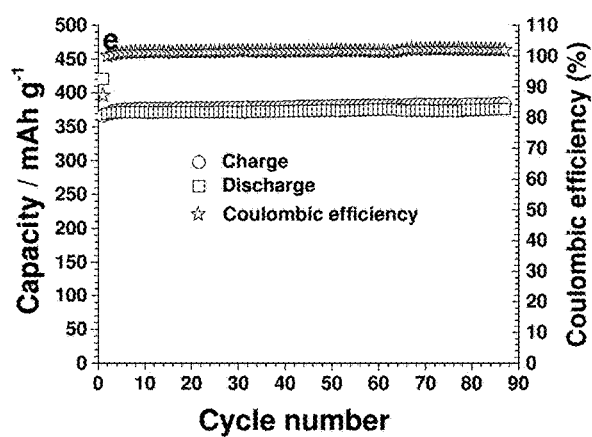
Figure 11F:
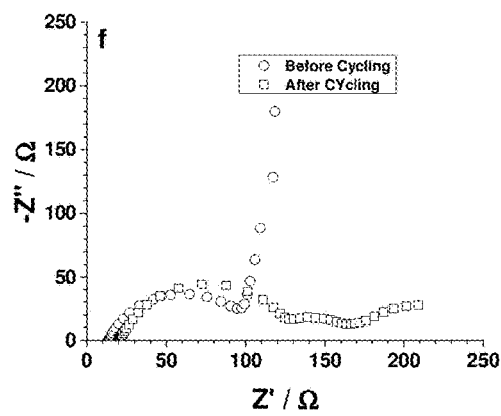

FIG. 11E shows the cycling performance and coulombic efficiencies of NG∥Li cells using 0.8 M LiBFPMB/EC-EMC (½, by wt.) under a current rate of C/10. The initial charge and discharge capacities were 366.5 and 420.6 mAh g$^{-1}$, respectively, resulting in an initial coulombic efficiency of 87.1%. However, during the second cycle, both charge and discharge capacities are 369 mAh g$^{-1}$, resulting in a coulombic efficiency of 100%. Thereafter, both charge and discharge capacities increased slowly with cycling, with a coulombic efficiency maintained between 101 and 102%. For example, after 100 cycles, the charge and discharge capacities were 383.8 and 376.2 mAh g$^{-1}$, respectively. As shown in FIG. 11F, the total impedance of the cell increased from 80Ω before cycling to 140Ω after 100 cycles, which is the slowest growth among the three cells, i.e. LiNi$_{0.5}$Mn$_{1.5}$O$_4$∥Li, LiCoO$_2$∥Li, and NG∥Li.

Figure 12A:
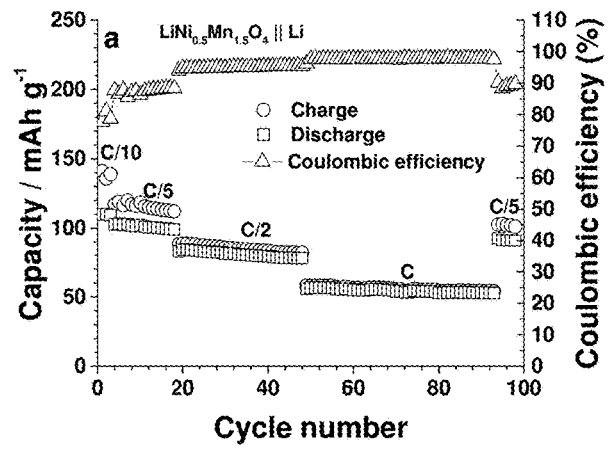
FIGS. 12A-12F. Cycling performance and electrochemical impedance spectroscopy of LiNi$_{0.5}$Mn$_{1.5}$O$_4$∥Li (FIGS. 12A and 12B, respectively), LiMn$_2$O$_4$∥Li (FIGS. 12C and 12D, respectively), and NG∥Li cell (FIGS. 12E and 12F, respectively) using 1.0M LiDFPFMB/EC-EMC (½ by wt.) at different current rates.
Figure 12B:
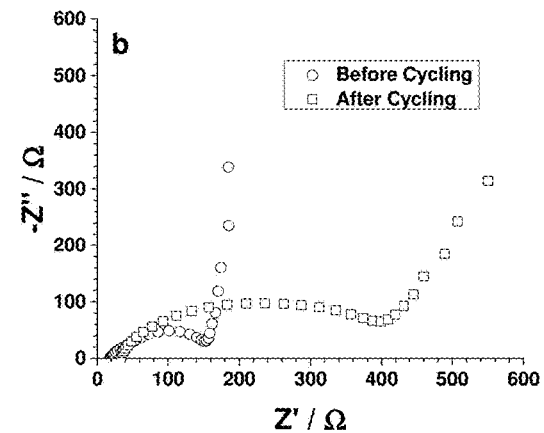

FIG. 12A shows the cycling performance and coulombic efficiencies of LiNi$_{0.5}$Mn$_{1.5}$O$_4$∥Li cells based on 1.0 M LiDFPFMB/EC-EMC (½, by wt.) under different current rates. During the three formation cycles at a current rate of C/10, the charge and discharge capacities were 109.8 and 141 mAh g$^{-1}$, respectively, with an initial low coulombic efficiency of 77.9%. When the current rate was increased to C/5, the charge and discharge capacities decreased to 120 and 103 mAh g$^{-1}$, with coulombic efficiency increased to 85.8%. The charge and discharge capacities gradually decreased with cycling and they stabilized at 112 and 99 mAh g$^{-1}$ after 15 cycles. When the current rate was increased to C/2, the charge and discharge capacities decreased to 88.2 and 82.8 mAh g$^{-1}$, with coulombic efficiency further increased to 93.9%. The charge and discharge capacities then gradually decreased to 81.8 and 78.1 mAh g$^{-1}$ after 30 cycles. When the current rate was further increased to C, the charge and discharge capacity decreased to 58.1 and 55.8 mAh g$^{-1}$, respectively, which gradually decreased to around 54.1 and 52.8 mAh g$^{-1}$ after 45 cycles with coulombic efficiency stabilized at 97.5%. When the current was reduced back to C/5, the charge and discharge capacities recovered to 102.6 and 92.6 mAh g$^{-1}$, respectively, with coulombic efficiency dropped to 90%. The above results show that higher current rates result in higher coulombic efficiencies. FIG. 12B shows the comparison of the electrochemical impedance spectroscopy, which increased from 133Ω before cycling to 365Ω after 100 cycles.

Figure 12C:
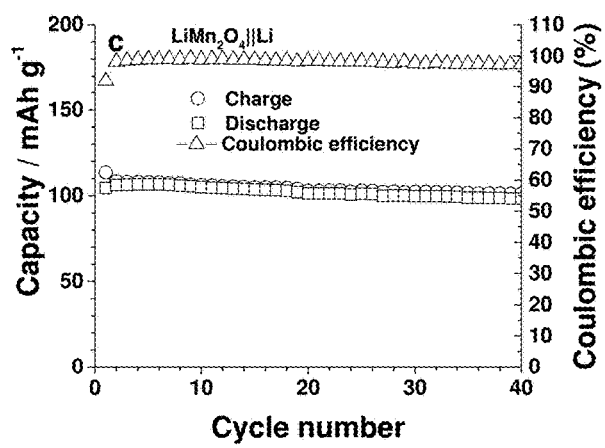
Figure 12D:
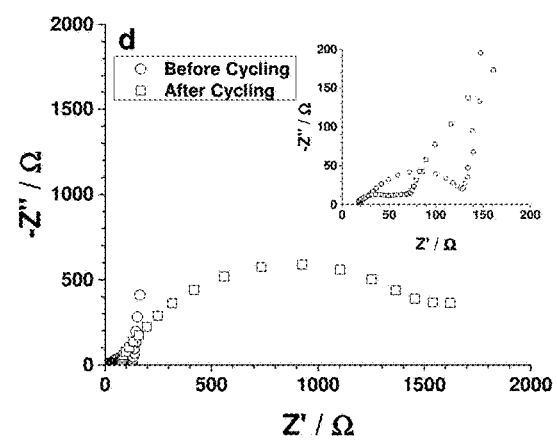

FIG. 12C shows the cycling performance and coulombic efficiencies of LiMn$_2$O$_4$∥Li cells based on 1.0 M LiDFPFMB/EC-EMC (½, by wt.) under a current rate of C/10. The initial charge and discharge capacities were 113.6 and 104.4 mAh g$^{-1}$, respectively, with an initial high coulombic efficiency of 91.9%. The charge and discharge capacities gradually decreased with cycling to 101 and 98.4 mAh g$^{-1}$ after 40 cycles, with a coulombic efficiency of 97.4%. FIG. 12D shows the comparison of the total electrochemical impedance spectroscopy of the cell, which increased from 110Ω before cycling to 1600Ω after 50 cycles. The higher total impedance is directly responsible for the low charge-discharge capacities.

Figure 12E:
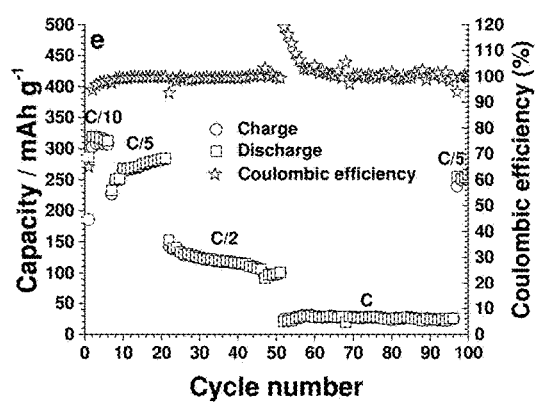

FIG. 12E shows the cycling performance and coulombic efficiencies of NG∥Li cells based on 1.0 M LiDFPFMB/EC-EMC (½, by wt.) under different current rates. During the first formation cycle at a current rate of C/10, the charge and discharge capacities were 186 and 286 mAh g$^{-1}$, respectively, with an initial low coulombic efficiency of 65%. However, during the second cycle, the charge and discharge capacities quickly increased to 303 and 320 mAh g$^{-1}$, respectively, with a coulombic efficiency of 94.7%. Thereafter, both charge and discharge capacities gradually decreased with cycling. When the current rate was increased to C/5, the charge and discharge capacities initially decreased to 226.9 and 233 mAh g$^{-1}$ and then gradually increased with cycling, with coulombic efficiency close to 100%. When the current rate was increased to C/2, the charge and discharge capacities were 143.1 and 152.8 mAh g$^{-1}$, which gradually decreased to 100.1 and 100.8 mAh g$^{-1}$, respectively after 30 cycles. When the current rate was further increased to C, the reversible capacity was only around 30 mAh g$^{-1}$. However, when the current was reduced back to C/5, the reversible capacity immediately recovered back to 250 mAh g$^{-1}$.

Figure 12F:
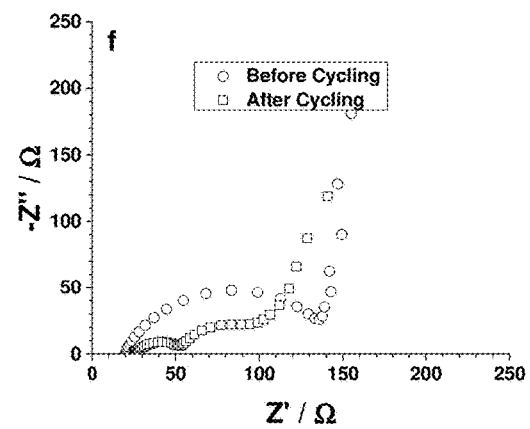

FIG. 12F compares the total electrochemical impedance spectroscopy of the cell, which decreased from 113Ω before cycling to 78Ω after 100 cycles. The lower cell resistance after cycling compared to before cycling indicates that the formed SEI is more conductive towards lithium cation than the pristine lithium oxide covered on the surface of lithium metal.

Figure 13A:
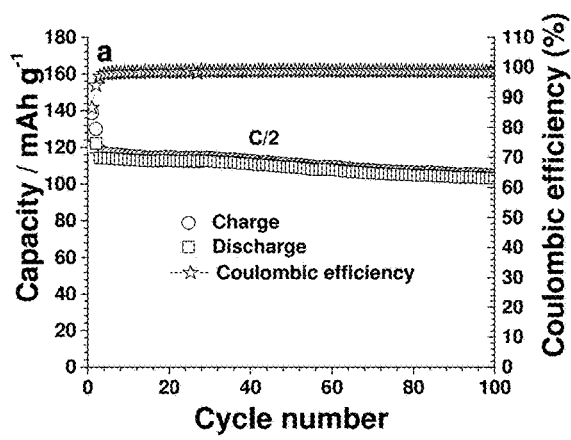
FIGS. 13A, 13B. Charge-discharge capacities and coulombic efficiencies of the LiNi$_{0.5}$Mn$_{1.5}$O$_4$∥Li half-cell using (a) 1.0M LiDFMFMB (FIG. 13A) and (b) 1.0M LiDFEFMB (FIG. 13B) under different current rates (the first two formation cycles were carried out at C/5 followed by C/2 for the remaining cycles).
Figure 13B:
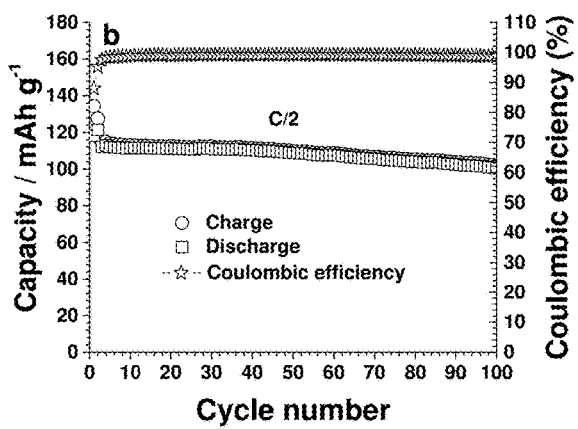

The cycling performance and coulombic efficiencies of LiNi$_{0.5}$Mn$_{1.5}$O$_4$∥Li cells based on 1.0 M LiDFMFMB/EC- EMC, 1.0 M LiDFEFMB/EC-EMC, and 1.0M LiDFPFMB/EC-EMC were tested under different current rates, respectively. FIGS. 13A and 13B show the cycling performance and coulombic efficiencies of LiNi$_{0.5}$Mn$_{1.5}$O$_4$‖Li cells based on 1.0 M LiDFMFMB/EC-EMC and 1.0 M LiDFEFMB/EC-EMC under different current rates, respectively. The initial reversible capacities for LiDFMFMB, LiDFEFMB, and LiDFPFMB based solutions at C/2 are 114, 112, and 105 mAh g$^{-1}$, and after 100 cycles they decrease to 103, 101 and 95 mAh g$^{-1}$, respectively. All the coulombic efficiencies are maintained around 99%.

Figure 14A:
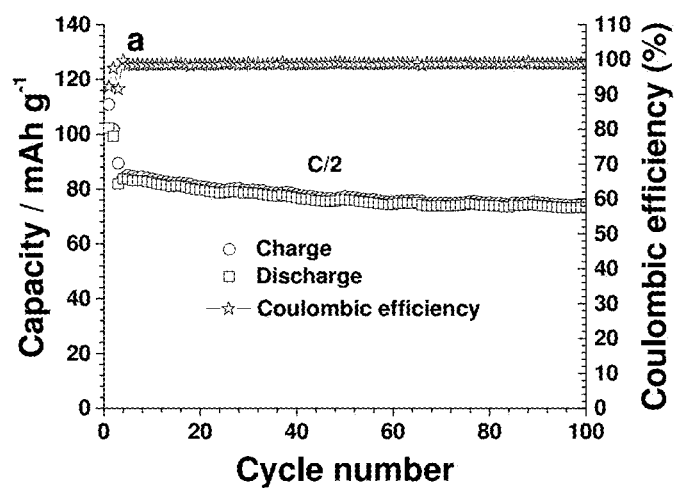
FIGS. 14A-14C. Charge-discharge capacities and coulombic efficiencies of the LiMn$_2$O$_4$∥Li half-cell using (a) 1.0M LiDFMFMB (FIG. 14A), (b) 1.0M LiDFEFMB (FIG. 14B), and (c) 1.0 M LiDFPFMB (FIG. 14C) in EC-EMC (½ by wt.) under different current rates (the first two formation cycles were carried out at C/5 followed by C/2 for the remaining cycles).
Figure 14B:
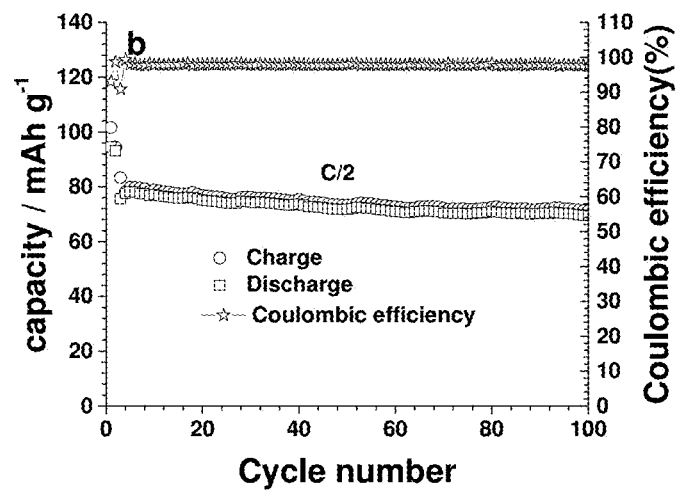
Figure 14C:
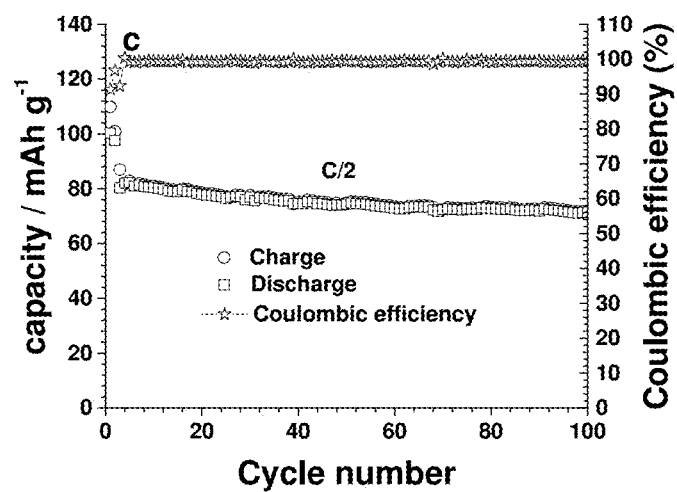

FIGS. 14A, 14B and 14C show the cycling performance and coulombic efficiencies of LiMn$_2$O$_4$‖Li cells based on 1.0 M LiDFMFMB/EC-EMC, 1.0 M LiDFEFMB/EC-EMC, and 1.0M LiDFPFMB/EC-EMC under different current rates, respectively. The initial reversible capacities for LiDFMFMB, LiDFEFMB, and LiDFPFMB based solutions at C/2 are 84, 78, and 82 mAh g$^{-1}$, and after 100 cycles they decrease to 74, 70 and 71 mAh g$^{-1}$, respectively. All the coulombic efficiencies are maintained around 99%.

Figure 15A:
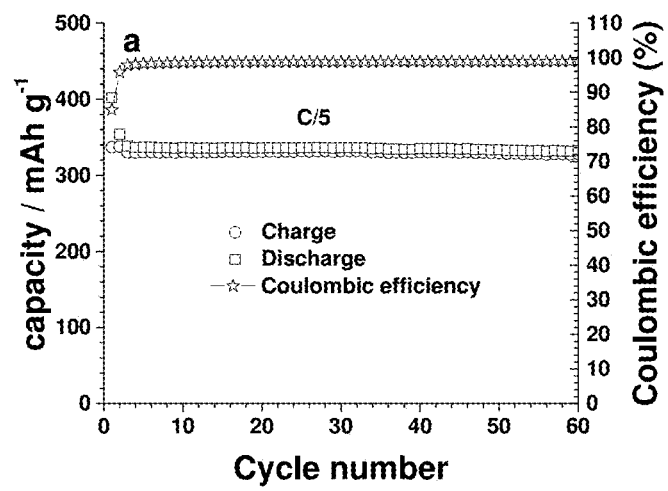
FIGS. 15A-15C. Charge-discharge capacities and coulombic efficiencies of the NG∥Li half-cell using (a) 1.0M LiDFMFMB (FIG. 15A), (b) 1.0M LiDFEFMB (FIG. 15B), and (c) 1.0 M LiDFPFMB (FIG. 15C) in EC-EMC (½ by wt.) under different current rates (the first two formation cycles were carried out at C/5 followed by C/2 for the remaining cycles).
Figure 15B:
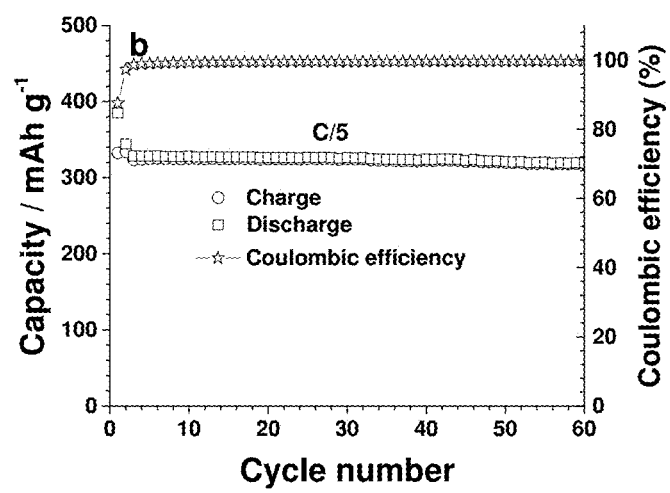
Figure 15C:
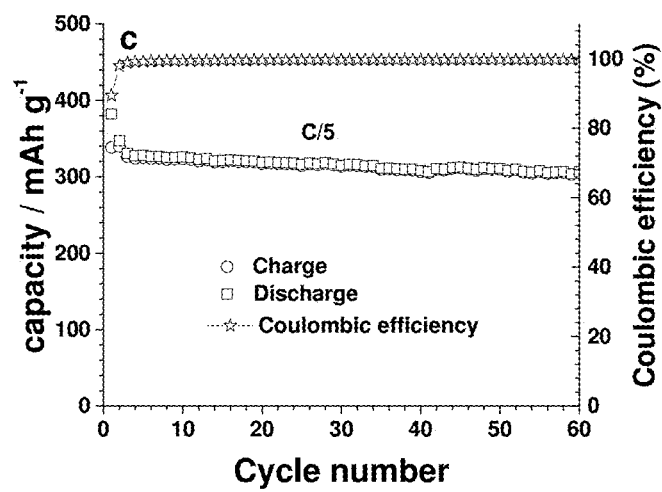

FIGS. 15A, 15B and 15C show the cycling performance and coulombic efficiencies of NG‖Li cells based on 1.0 M LiDFMFMB/EC-EMC, 1.0 M LiDFEFMB/EC-EMC, and 1.0M LiDFPFMB/EC-EMC under different current rates, respectively. The initial reversible capacities for LiDFMFMB, LiDFEFMB, and LiDFPFMB based solutions at C/5 are 337, 329, and 330 mAh g$^{-1}$, and after 60 cycles they decrease to 332, 320 and 300 mAh g$^{-1}$, respectively. All the coulombic efficiencies are maintained around 99.7%. The above results indicate that LiDFMFMB has better cell performance, partially might be due to the smaller anion and higher ionic conductivity.

CONCLUSIONS

In summary, two symmetric and three asymmetric fluorine and alkyl-substituted lithium malonatoborate salts, LiBMFMB, LiBPFMB, LiDFMFMB, LiDFEFMB, and LiDFPFMB were synthesized and tested for application in lithium-ion batteries. These new lithium salts showed improved stability than the solely fluorine-substituted lithium malonatoborate salt, LiBFMB. These new salts are not only compatible with 4.0V cathodes such as LiCoO$_2$ and LiMn$_2$O$_4$, but also compatible with 5.0V cathodes, such as LiNi$_{0.5}$Mn$_{1.5}$O$_4$ and graphite anode, which is an advance in the effort to produce 5.0 V lithium-ion batteries on a commercial basis. These new salts not only show good cycling performance but also show good rate capability and thus are very promising candidates for practical applications in lithium-ion batteries and energy storage.

While there have been shown and described what are at present considered the preferred embodiments of the invention, those skilled in the art may make various changes and modifications which remain within the scope of the invention defined by the appended claims.

What is claimed is:

1. An electrolyte salt of the general formula Li$^+$Z$^-$, wherein Z$^-$ has the following chemical formula:

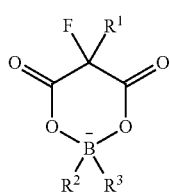

(1)

wherein R$^1$ is an alkyl group (R') containing at least one and up to four carbon atoms, and R$^2$ and R$^3$ are fluorine atoms.

2. An electrolyte salt of the general formula Li$^+$Z$^-$, wherein Z$^-$ has the following chemical formula:

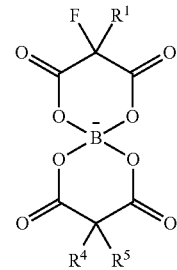

(1a)

wherein R$^1$ is an alkyl group (R'); R$^4$ is a fluorine atom; and R$^5$ is a fluorine atom or an alkyl group (R'); wherein R' contains at least one and up to four carbon atoms.

3. An electrolyte composition for a lithium-ion battery, the electrolyte composition comprising an electrolyte salt of the general formula Li$^+$Z$^-$ dissolved in a liquid or gel solvent suitable for use in a lithium-ion battery, wherein Z$^-$ has the following chemical formula:

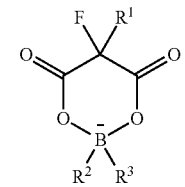

(1)

wherein R$^1$ is an alkyl group (R') containing at least one and up to four carbon atoms, and R$^2$ and R$^3$ are fluorine atoms.

4. The electrolyte composition of claim 3, wherein the liquid or gel solvent is a carbonate or sulfone solvent.

5. The electrolyte composition of claim 3, wherein the liquid or gel solvent is an ionic liquid solvent.

6. An electrolyte composition for a lithium-ion battery, the electrolyte composition comprising an electrolyte salt of the general formula Li$^+$Z$^-$ dissolved in a liquid or gel solvent suitable for use in a lithium-ion battery, wherein Z$^-$ has the following chemical formula:

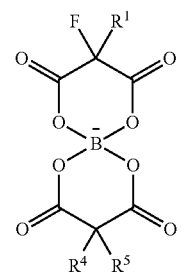

(1a)

wherein R$^1$ is an alkyl group (R'); R$^4$ is a fluorine atom; and R$^5$ is an alkyl group (R'); wherein R' contains at least one and up to four carbon atoms.

7. A lithium-ion battery comprising:
(a) an anode;
(b) a cathode; and
(c) an electrolyte composition comprising an electrolyte salt of the general formula Li$^+$Z$^-$ dissolved in a liquid or gel solvent suitable for use in a lithium-ion battery, wherein Z$^-$ has the following chemical formula:

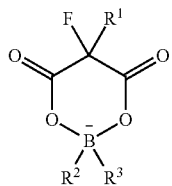

(1)

wherein R$^1$ is an alkyl group (R') containing at least one and up to four carbon atoms, and R$^2$ and R$^3$ are fluorine atoms.

8. The lithium-ion battery of claim 7, wherein the liquid or gel solvent is a carbonate or sulfone solvent.

9. The lithium-ion battery of claim 7, wherein the liquid or gel solvent is an ionic liquid solvent.

10. A lithium-ion battery comprising:
(a) an anode;
(b) a cathode; and
(c) an electrolyte composition comprising an electrolyte salt of the general formula Li$^+$Z$^-$ dissolved in a liquid or gel solvent suitable for use in a lithium-ion battery, wherein Z$^-$ has the following chemical formula:

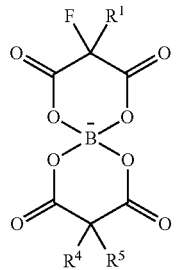

(1a)

wherein R$^1$ is an alkyl group (R'); R$^4$ is a fluorine atom; and R$^5$ is an alkyl group (R'), wherein R' contains at least one and up to four carbon atoms.

11. An electrolyte salt of the general formula Li$^+$Z$^-$, wherein Z$^-$ has the following chemical formula:

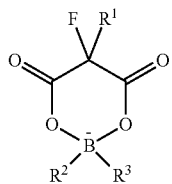

(1)

wherein R$^1$ is an alkyl group (R') containing at least one and up to four carbon atoms and one ether functionality, and R$^2$ and R$^3$ are fluorine atoms.

12. An electrolyte composition for a lithium-ion battery, the electrolyte composition comprising an electrolyte salt of the general formula Li$^+$Z$^-$ dissolved in a liquid or gel solvent suitable for use in a lithium-ion battery, wherein Z$^-$ has the following chemical formula:

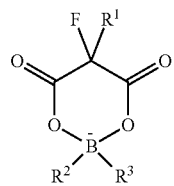

(1)

wherein R$^1$ is an alkyl group (R') containing at least one and up to four carbon atoms and one ether functionality, and R$^2$ and R$^3$ are fluorine atoms.

13. The electrolyte composition of claim 12, wherein the liquid or gel solvent is a carbonate or sulfone solvent.

14. The electrolyte composition of claim 12, wherein the liquid or gel solvent is an ionic liquid solvent.

15. A lithium-ion battery comprising:

(a) an anode;

(b) a cathode; and (c) an electrolyte composition comprising an electrolyte salt of the general formula Li$^+$Z$^-$ dissolved in a liquid or gel solvent suitable for use in a lithium-ion battery, wherein Z$^-$ has the following chemical formula:

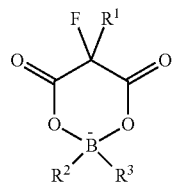

(1)

wherein R$^1$ is an alkyl group (R') containing one and up to four carbon atoms and one ether functionality, and R$^2$ and R$^3$ are fluorine atoms.

16. The lithium-ion battery of claim 15, wherein the liquid or gel solvent is a carbonate or sulfone solvent.

17. The lithium-ion battery of claim 15, wherein the liquid or gel solvent is an ionic liquid solvent.

* * * * *